(12) United States Patent
Smithrud et al.

(10) Patent No.: US 10,783,322 B2
(45) Date of Patent: Sep. 22, 2020

(54) ENHANCED DIGITAL INK ERASING

(71) Applicant: Microsoft Technology Licensing, LLC, Redmond, WA (US)

(72) Inventors: Joshua M. Smithrud, Issaquah, WA (US); Taylor S. Williams, Seattle, WA (US); Craig A. Macomber, Seattle, WA (US); Paul J. Kwiatkowski, Redmond, WA (US); Marcel Lugosan, Kirkland, WA (US); Travis P. Dorschel, Issaquah, WA (US); Simon J. Schaffer, Seattle, WA (US); Shane J. Clifford, Woodinville, WA (US); Nicholas J. Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 15/721,734

(22) Filed: Sep. 29, 2017

(65) Prior Publication Data
US 2019/0102079 A1    Apr. 4, 2019

(51) Int. Cl.
*G06F 40/171* (2020.01)
*G06F 3/0354* (2013.01)
*G06F 3/0488* (2013.01)

(52) U.S. Cl.
CPC ........ *G06F 40/171* (2020.01); *G06F 3/03545* (2013.01); *G06F 3/04883* (2013.01)

(58) Field of Classification Search
None
See application file for complete search history.

(56) References Cited

U.S. PATENT DOCUMENTS

| 2011/0199297 A1* | 8/2011 | Antonyuk | G06F 3/04883 345/157 |
| 2014/0006983 A1* | 1/2014 | Goodman | G06F 3/0483 715/764 |
| 2016/0224239 A1* | 8/2016 | Angelov | G06Q 10/101 |

* cited by examiner

*Primary Examiner* — Amr A Awad
*Assistant Examiner* — Donna V Lui
(74) *Attorney, Agent, or Firm* — Talem IP Law, LLP

(57) ABSTRACT

Techniques are presented for enhanced erasing of digital ink. The ink erasing feature of a content creation application can preserve the complex shapes that can result from partial erasure of ink strokes. The ink erasing feature can receive ink stroke data from an ink stroke and display the ink stroke. The ink erasing feature can then receive and display an eraser stroke that contacts the ink stroke. Once the eraser stroke is received, the ink erasing feature can determine whether any eraser segment of the eraser stroke contacts the ink stroke. If an eraser segment does not contact the ink stroke, the ink erasing feature discards the eraser segment. If an eraser segment does contact the ink stroke, the ink erasing feature can update the ink stroke data based on amount of overlap and location of contact between the eraser stroke and the ink stroke.

10 Claims, 27 Drawing Sheets

ENHANCED DIGITAL INK ERASING

BACKGROUND

On an erasable physical surface such as a whiteboard, ink strokes, especially thick ones, can be partially erased in ways that yield complex remaining shapes. Since users expect ink on a digital whiteboard to be editable (e.g. selected, moved, deleted), visible ink strokes should behave as distinct objects, even when they are the product of longer strokes being split when they were partially erased. However, it can be challenging to recreate a realistic and immersive experience for the user.

BRIEF SUMMARY

Techniques are presented for enhanced erasing of digital ink. The ink erasing feature of the content creation application can preserve the complex shapes that can result from partial erasure of ink strokes.

The ink erasing feature can receive ink stroke data from an ink stroke and the ink stroke can be displayed. The ink stroke data can include a set of ink points. Two adjacent ink points can be considered connected by a corresponding ink segment. After the ink stroke is displayed, the ink erasing feature can receive and display an eraser stroke that contacts the ink stroke. The eraser stroke can include eraser stroke data, including a set of eraser points. Two adjacent eraser points can be considered connected by an eraser segment.

The eraser stroke can contact the ink stroke in a variety of ways. In one case, the eraser stroke can intersect the ink stroke at one of the ink points or in between two of the ink points. In another case, the eraser stroke can overlap the ink stroke without dividing the ink stroke. In another case, the eraser stroke may intersect the ink stroke lengthwise. In yet another case, if the eraser stroke is substantially smaller than the ink stroke, the eraser stroke may cut a hole in the middle of the ink stroke. Each eraser stroke may contact the ink stroke in more than one location. Additionally, each eraser stroke may contact more than one ink stroke.

Once an eraser stroke that contacts the ink stroke is received, the ink erasing feature can determine whether each eraser segment of the eraser stroke contacts the ink stroke. If the eraser segment does not contact the ink stroke, the ink erasing feature can then discard the eraser segment. Further, if the eraser segment does contact the ink stroke, the ink erasing feature can update the ink stroke data based on amount of overlap and location of contact between the eraser stroke and the ink stroke.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
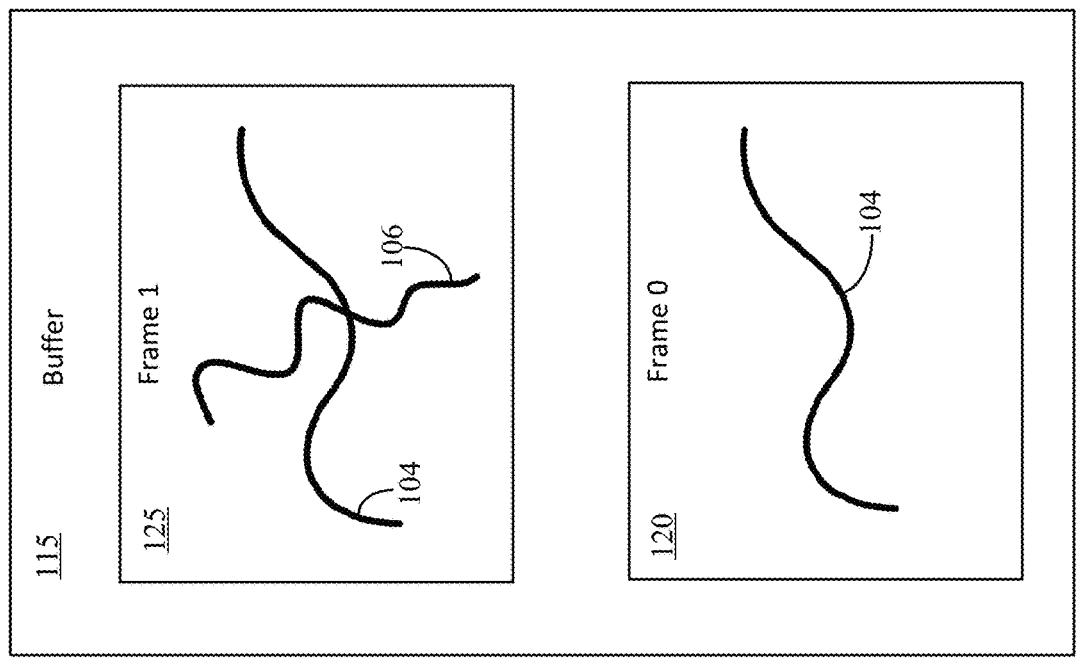
FIG. 1 illustrates an example operating environment in which various embodiments of the invention may be carried out.
Figure 1:
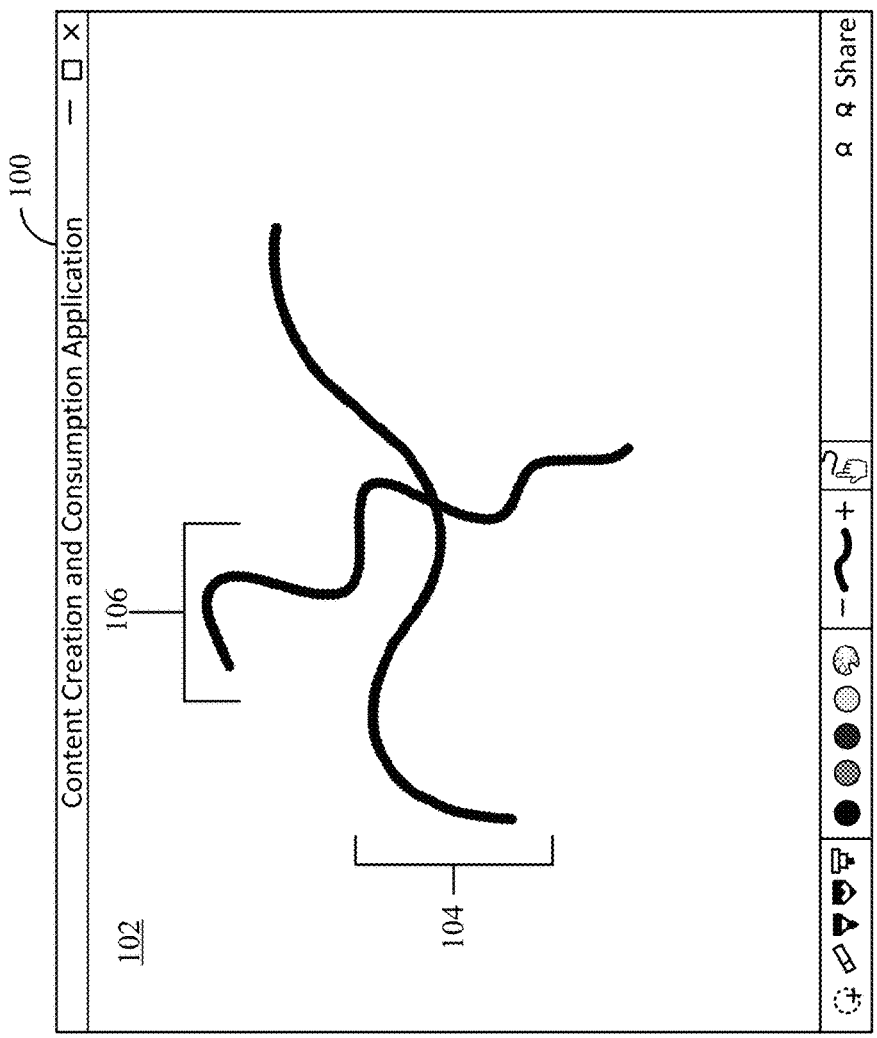

An ink erasing feature is presented for enhanced erasing of digital ink for content creation applications. The ink erasing feature of the content creation application can preserve the complex shapes that can result from partial erasure of ink strokes.

The ink erasing feature may provide a user a more intuitive visual representation of erasure. The ink erasing feature also handles scenarios that would be impossible using existing approaches that merely discard ink points based on intersection with an "eraser" object. These scenarios can include cutting lengthwise across an ink stroke, as well as cutting holes out of the interior of an ink stroke's geometry.

Existing approaches do not attempt to preserve the complex shapes that can result from partial erasure of ink strokes. Instead, some subset of the center-line segments are discarded, perhaps splitting the ink stroke into two or more strokes, and those strokes are rendered as if they had been drawn that way initially. For example, if a round nib is used to render a stroke that has been split in two by an eraser, each new stroke will have rounded ends, even if the eraser passed through the original stroke at a shallow angle, which would have left "sharp" corners on the remaining strokes on a physical whiteboard.

The described ink erasing feature is suitable for content creation and consumption applications that support a variety of different types of content, such as, but not limited to, digital ink, text, graphics, and images. The user interactions with the content creation and consumption application may be performed via a stylus, pen, user finger, or mouse, or other user interface device.

Digital ink refers to the mode of user input where a stylus or pen (or even user finger of a touchscreen or pad) is used to capture handwriting in its natural form. Digital ink strokes are markings that are represented by a set of properties and point data that a digitizer captures.

Content creation and consumption applications are software applications in which users can contribute, consume, and/or modify content. The content can be visual content where users can create text and/or image-based content in digital form. The content creation and consumption application may include a reader application and/or an editor application. The term "content creation and consumption application" may in some cases be synonymous with "content authoring application", "productivity application", or "content authoring tool", and such terms may be used interchangeably herein.

The ink erasing feature can receive ink stroke data from an ink stroke and the ink stroke can be displayed. The ink stroke data can include a set of ink points. Two adjacent ink points can be considered connected by a corresponding ink segment. After the ink stroke is displayed, the ink erasing feature can receive and display an eraser stroke that contacts the ink stroke. The eraser stroke can include eraser stroke data, including a set of eraser points. Two adjacent eraser points can be considered connected by a corresponding eraser segment.

The eraser stroke can contact the ink stroke in a variety of ways. In one case, the eraser stroke can intersect the ink stroke at one of the ink points or in between two of the ink points. In another case, the eraser stroke can overlap the ink stroke without intersecting the ink stroke. In another case, the eraser stroke may intersect the ink stroke lengthwise. In yet another case, if the eraser stroke is substantially smaller than the ink stroke, the eraser stroke may cut a hole in the middle of the ink stroke. Each eraser stroke may contact the ink stroke in more than one location. Additionally, each eraser stroke may contact more than one ink stroke.

Once an eraser stroke that contacts the ink stroke is received, the ink erasing feature can determine whether each eraser segment of the eraser stroke contacts the ink stroke. If the eraser segment does not contact the ink stroke, the ink erasing feature can then discard the eraser segment. Further, if the eraser segment does contact the ink stroke, the ink erasing feature can update the ink stroke data based on amount of overlap and location of contact between the eraser stroke and the ink stroke.

FIG. 1 illustrates an example operating environment in which various embodiments of the invention may be carried out. Referring to FIG. 1, a user may interact with a user computing device running application 100, such as a content application, through a UI 102 displayed on a display associated with the computing device. The computing device may be embodied as system 11500 such as described with respect to FIG. 15. The ink erasing feature can be a stand-alone application or an ink erasing feature of the content application to provide the functionality within the content application.

A computing device is configured to receive input from a user through, for example, a keyboard, mouse, trackpad, touch pad, touch screen, microphone, or other input device. The display of the user computing device is configured to display one or more user interfaces (including UI 102) to the user. In some embodiments, the display can include a touchscreen such that the user computing device may receive user input through the display.

The computing device may be a general-purpose device that has the ability to run one or more applications. The computing device may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, or a smart television.

The user interface ("UI") 102 can refer to the graphical user interface through which content appears to be created, conceptually being a substrate for a work of authorship. The UI 102 enables a user to interact with various applications, such as the content application, running on or displayed through the user computing device. Generally, UI 102 is configured such that a user may easily interact with functionality of an application. For example, a user may simply select (via, for example, touch, clicking, gesture or voice) an option within UI 102 to perform an operation such as selecting content being authored or edited in an application 100.

The user can execute numerous commands through the UI 102 in order to perform specific tasks related to features available in the application 100. In some cases, the user may have multiple devices running a similar program and the user can edit a same or different document (or other content) across multiple user computing devices.

In the example of FIG. 1, the user may draw ink strokes, such as ink stroke 104 and 106 on the UI 102. For example, the user may have drawn a first ink stroke (ink stroke 104) on the UI 102. The first ink stroke 104 is stored in a buffer 115 at frame 0 120. Then, later the user may have drawn second ink stroke (ink stroke 106) on the UI 102. The second ink stroke 106 is stored in the buffer 115 at frame 1 125 over the first ink stroke 104. In drawing an ink stroke, the ink stroke can have three stages, wet, damp, and dry.

Wet ink refers to ink strokes that are currently being drawn. Damp ink refers to ink strokes that have recently been drawn, but not yet been processed. A damp ink stroke is no longer being added to. Dry ink refers to ink strokes that have been processed.

An ink stroke that is currently being drawn ("wet ink") can be rendered to its own surface, so that the changing geometry of the ink stroke can be re-composited with the background (including other ink strokes) every frame. In some cases, the last portion of the ink stroke can be drawn into the separate surface, as long as it can be seamlessly blended with the earlier portion of the stroke.

In some cases, the user may erase one or more portions of the ink stroke. Erasing can use an eraser stroke that can remove portions of any ink strokes they intersect. This is accomplished by rendering eraser strokes using a special blending function that produces transparency where the erase stroke is at full opacity.

Eraser strokes should only erase ink strokes that were drawn before them, so eraser strokes and ink strokes are drawn in back to front order, starting with the dry strokes which may be cached in a separate texture to avoid redrawing every time wet ink changes. This ink texture can then be composited on an unerasable background such as an image or paper texture.

In some cases, erasable and unerasable content may be mixed. In this case, wet ink can be drawn as normal, but the content behind the wet ink is drawn twice to scratch textures, once including all content, and once including only the unerasable content. These two textures can then be composited together using a third texture containing all damp or wet erase strokes as a mask that interpolates between the two content textures.

As mentioned above, a damp ink stroke refers to an ink stroke that has been completed but not yet dried.

In the dry ink representation ("internal representation"), ink strokes are decorated with copies of intersecting eraser segments of all the eraser strokes that intersected them. These copies are referred to as "ink divots". Thus, while a given segment of an eraser stroke that intersected several ink strokes may be copied to each of those ink strokes, many eraser stroke segments may never be copied. The original eraser strokes can be discarded when the drying process is complete. With this internal representation, each dry ink stroke can be rendered independently.

In some cases, there may be long ink segments or thin eraser strokes. In this case, when an ink stroke is split, the result may include two or more portions of a single ink segment remaining visible, even after the ink divots are removed. Only one of the two or more portions is actually a part of a given ink stroke. The desired portion can be identified with an accompanying (x, y) coordinate (e.g., coordinate point). When it is time to render the ink stroke, a geometry mask can be generated that excludes all portions of the ink segment except the portion of the ink segment containing the coordinate. Similarly, at hit-testing time, the generated ink stroke geometry includes only the ink segment portion containing the coordinate point. Ink splitting will be later discussed in more detail.

Figure 2:
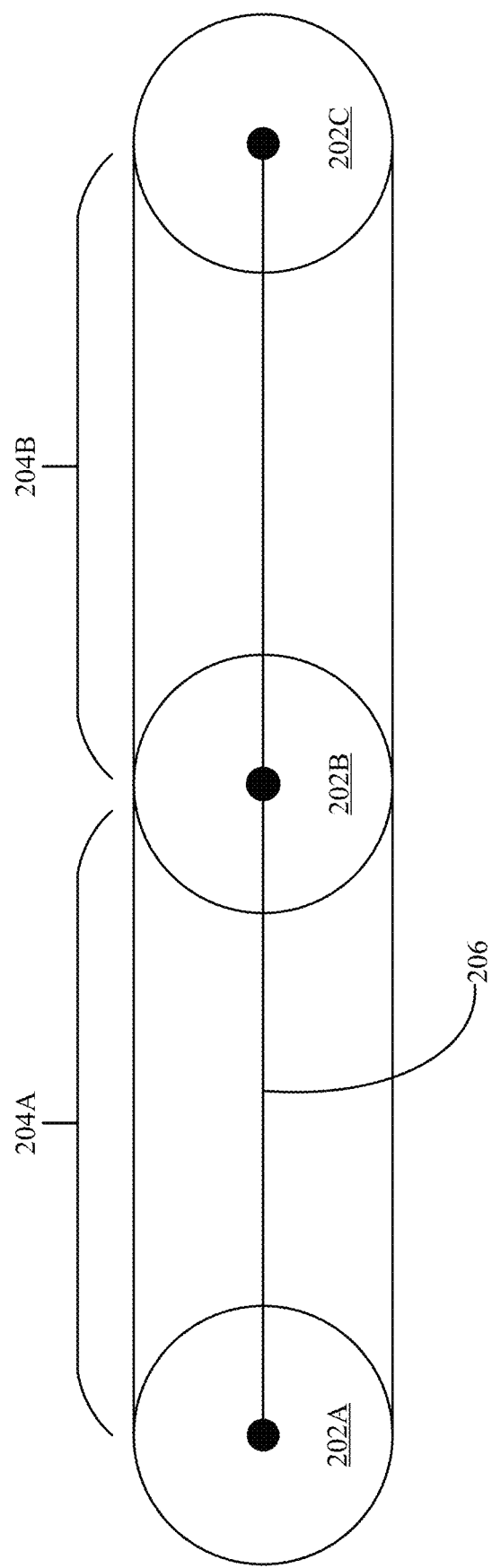
FIG. 2 illustrates an example ink stroke.
Figure 3:
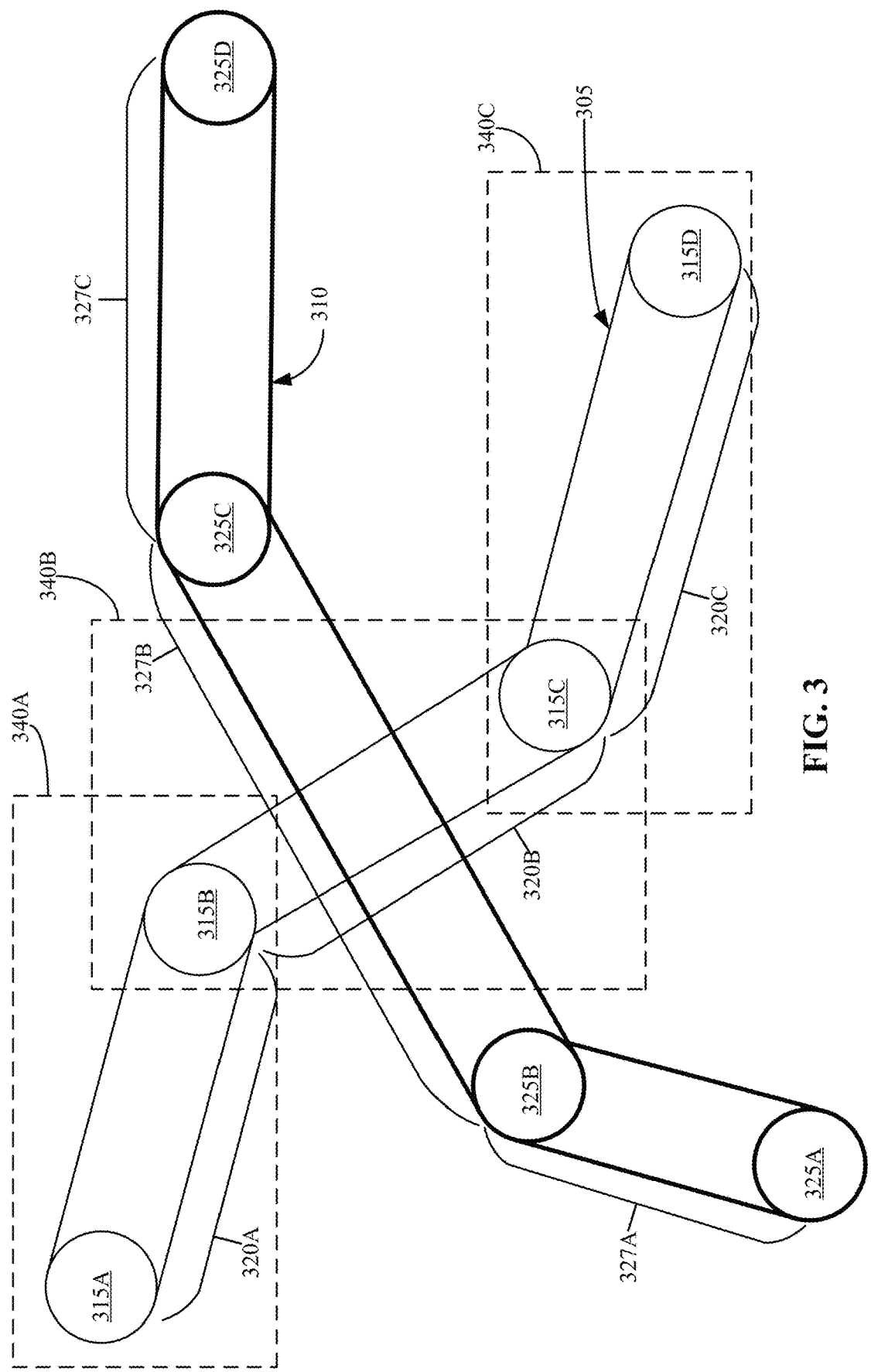
FIG. 3 illustrates an example ink stroke and intersecting eraser stroke.

FIG. 2 illustrates an example ink stroke; and FIG. 3 illustrates an example ink stroke and intersecting eraser stroke. Referring to FIG. 2, an ink stroke refers to a set of properties and point data that a digitizer captures that represent the coordinates and properties of a "marking". It can be the set of ink stroke data that is captured in a single pen down, up, or move sequence. The set of data can include parameters such as, but not limited to, a beginning of the stroke, an end of the stroke, the pressure of the stroke, the tilt (e.g., of a pen) for the stroke, the direction of the stroke, the time and timing of the stroke between discrete coordinates along the path of the stroke, and the color of the 'ink'. The eraser stroke may have a transparent color.

A digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, information such as pressure, speed of motion between points, and direction of motion can be collected.

An ink stroke can include a set of binary ink points ("ink points") (e.g., ink point 202A, ink point 202B, and ink point 202C), as well as a mathematical center-line 206 comprising set of ink segments (e.g., ink segment 204A and ink segment 204B) that connect the ink points. The ink points can be represented as a nib shape. Nib shape refers to the shape of the pen that a user is drawing with.

Referring to FIG. 3, using a UI of a content application, a user may first draw an ink stroke 305 and then draw an eraser stroke 310 through the ink stroke. The eraser stroke 310 intersects the ink stroke 305 through ink segment 320B, appearing to split the ink stroke 305 into two separate ink strokes. The ink stroke 305 includes a plurality of ink points with adjacent ink points connected by corresponding ink segments. In FIG. 3, four ink points 315 (e.g., ink point 315A, ink point 315B, ink point 315C, and ink point 315D) and three ink segments 320 (e.g., ink segment 320A, ink segment 320B, and ink segment 320C) connecting the ink points are shown. The eraser stroke 310 includes a plurality of eraser points with adjacent eraser points connected by corresponding eraser segments. In FIG. 3, four eraser points 325 (e.g., eraser point 325A, eraser point 325B, eraser point 325C, and eraser point 325D) and three eraser segments 327 (eraser segment 327A, eraser segment 327B, and eraser segment 327C) connecting the eraser points 325 are shown.

The ink erasing feature can determine whether any eraser segment of the eraser stroke 310 contacts the ink stroke 305. Indeed, the ink erasing feature can determine whether the geometry of an eraser segment of the eraser stroke contacts the geometry of an ink stroke segment. In the example of FIG. 3, the eraser stroke 310 contacts the ink stroke 305 in only one eraser segment (e.g., eraser segment 327B). Therefore, during the drying and ink splitting process, only eraser segment 327B is used to create an ink divot and the remaining eraser segments (e.g., eraser segment 327A and eraser segment 327C) are discarded.

When damp ink is converted to dry ink, a single ink stroke can sometimes be replaced with multiple non-contiguous ink strokes. In some cases, ink segments can be duplicated in two or more sub ink strokes. These are the cases that will require the stored (x, y) coordinate (e.g., the coordinate point) for each duplicated ink segment to identify which portion of the ink segment belongs to its parent stroke.

When an ink stroke is split into multiple non-contiguous ink strokes, multiple sub ink strokes may be stored. Each sub ink stroke may be an N-ink-point sub section of the ink stroke. For example, in FIG. 3, a first sub ink stroke may be stored that includes ink point 315A, ink point 315B, and ink point 315C and ink segment 320A and ink segment 320B; and a second sub ink stroke may be stored that includes ink point 315B, ink point 315C, and ink point 315D and ink segment 320B and ink segment 320C. The amount of ink points and ink segments stored in each sub ink stroke depends on the length of the ink stroke and the location of the eraser stroke intersection(s).

The drying and splitting process begins by taking a batch of potentially intermixed ink and erase strokes. This batch should extend all the way to the bottom of the damp strokes (so they draw in back-to-front order) and include dry strokes and damp strokes, but not wet strokes. If strokes are finished in an order different from how they are started, drying may be delayed until the lower wet strokes become damp. When an erase stroke is dried it is applied to all damp strokes below it (e.g., all the dry strokes the eraser stroke might intersect) as well as any dry strokes.

When splitting an ink stroke, the geometry of the erase stroke can be "cut out" of that stroke's own geometry. Each resulting, discrete (non-intersecting) geometrical "fragment" is then treated as a separate ink stroke, storing necessary metadata to ensure that no visible rendering artifacts occur after the splitting operation has been completed. This data includes the set of ink erase divots that contributed to its split, the set of ink points still required for the ink stroke's rendering (a subset of the parent stroke's ink points). An additional piece of data may be required when an eraser stroke splits an ink stroke in such a way that after removing unneeded ink segments and areas covered by the ink divots there are still some remaining disconnected areas (which are not part of the given sub ink stroke). To differentiate the desired area from any others, the single (x, y) coordinate (e.g., the coordinate point) within the correct area's geometry is recorded.

To the user, the ink stroke looks geometrically identical before and after the drying and splitting operations have occurred, but each resulting sub ink stroke can be moved, scaled, etc. independently from the others.

In addition to giving a much more intuitive visual representation of erasure, the geometrical splitting approach allows the ability to handle scenarios that would be impossible using existing approaches that merely discard ink points based on intersection with an "eraser" object (e.g. cutting lengthwise across a stroke, or cutting holes out of the interior of a stroke's geometry).

In some cases, bounding boxes (e.g., bounding box 340A, bounding box 340B, and bounding box 340C) can be used to optimize digital ink erasing. Each of the ink stroke segments 320 may be surrounded by a bounding box. For example, bounding box 340A surrounds ink segment 320A, bounding box 340B surrounds ink segment 320B, and bounding box 340C surrounds ink segment 320C. The bounding boxes may also be used for optimizing the hit-testing process. The hit-testing process can determine what portion of an ink stroke a user has selected.

Figure 4:
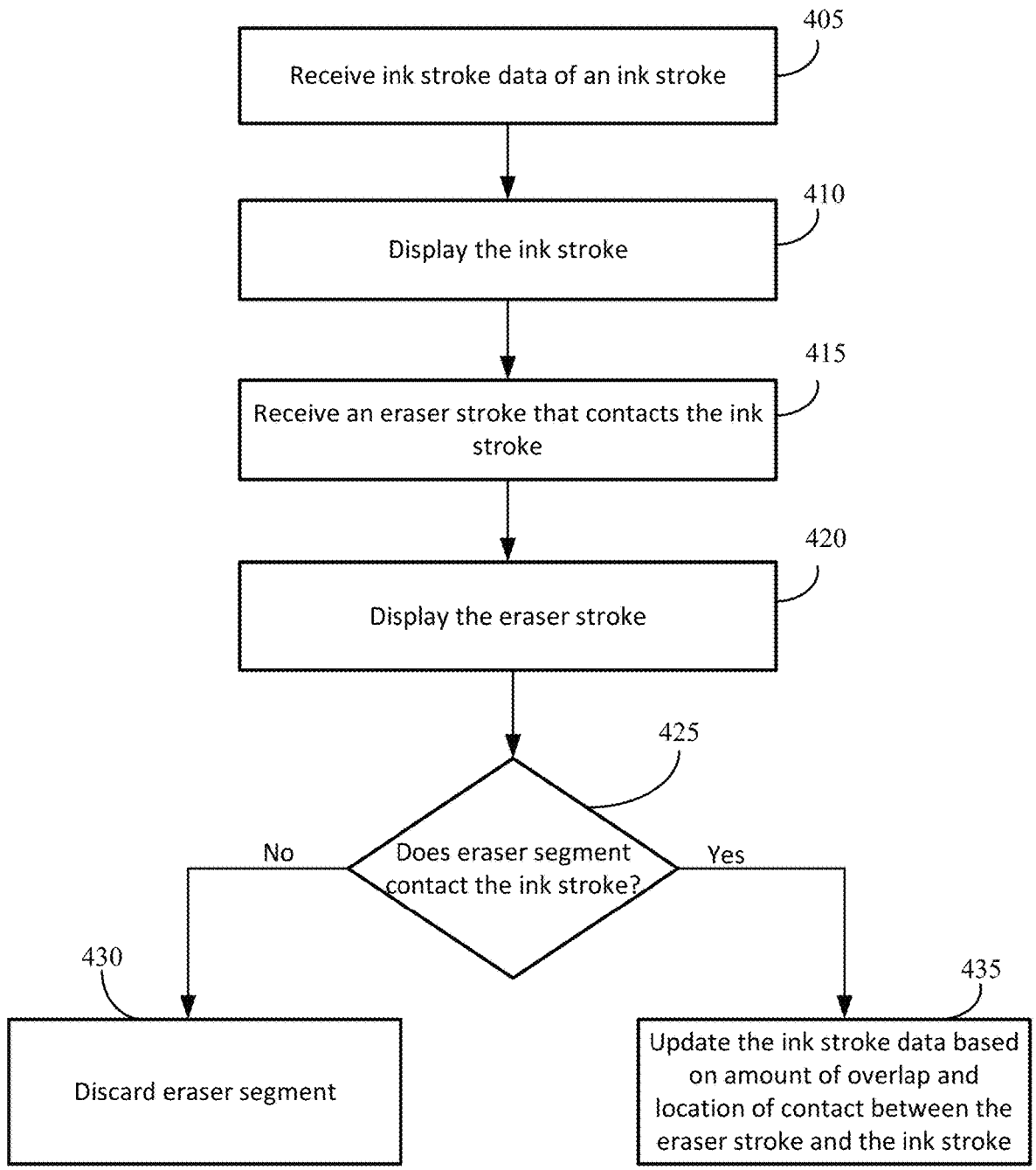
FIG. 4 illustrates an example process flow diagram for a method for enhanced digital ink erasing.

FIG. 4 illustrates an example process flow diagram for a method for enhanced digital ink erasing. Referring to FIG. 4, ink stroke data from an ink stroke can be received (405) and the ink stroke can be displayed (410). As previously described, the ink stroke data can include a set of ink points. Two adjacent ink points can be considered connected by a corresponding ink segment.

After the ink stroke is displayed (410) an eraser stroke that contacts the ink stroke can be received (415) and displayed (420). The eraser stroke can include eraser stroke data, including a set of eraser points. Two adjacent eraser points can be considered connected by an eraser segment. The eraser stroke can contact the ink stroke in a variety of ways. In one case, the eraser stroke can intersect the ink stroke at one of the ink points or in between two of the ink points. In another case, the eraser stroke can overlap the ink stroke without splitting the ink stroke. In another case, the eraser stroke may intersect the ink stroke lengthwise. In yet another case, if the eraser stroke is substantially smaller than the ink stroke, the eraser stroke may cut a hole in the middle of the ink stroke. Each eraser stroke may contact the ink stroke in more than one location. Additionally, each eraser stroke may contact more than one ink stroke.

Once an eraser stroke that contacts the ink stroke is received (415), the ink erasing feature can determine whether each eraser segment of the eraser stroke contacts the ink stroke (425). If the eraser segment does not contact the ink stroke, the ink erasing feature can then discard the eraser segment (430). Further, if the eraser segment does contact the ink stroke, the ink erasing feature can update the ink stroke data based on amount of overlap and location of contact between the eraser stroke and the ink stroke (435). The process for updating the ink stroke data will be discussed in more detail in the discussion of FIGS. 5A-11.

The ink stroke can be considered a damp ink stroke until a drying and optional splitting process is completed. Once converted to dry ink, each remaining portion of the ink stroke that was split by the eraser stroke can be manipulated as a separate object and rendered independently. The original eraser stroke may be discarded when the drying processes is completed.

Figure 5A:
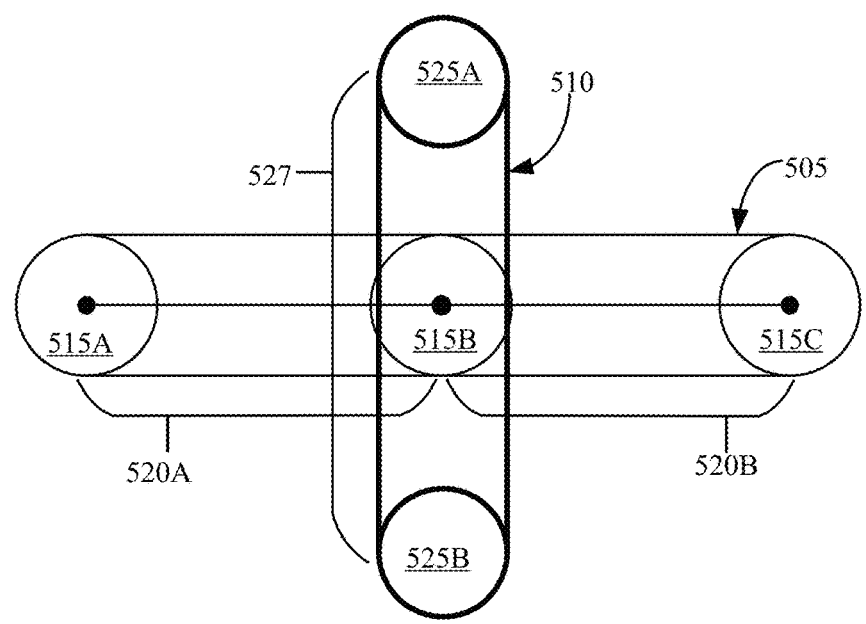
FIGS. 5A-5C illustrate example scenarios of an eraser stroke intersecting an ink stroke at an ink point.
Figure 5B:
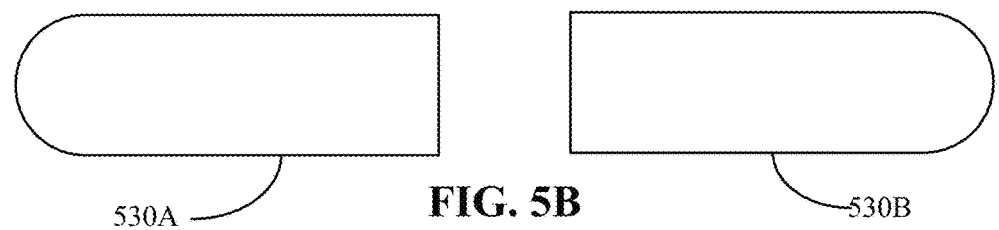
Figure 5C:
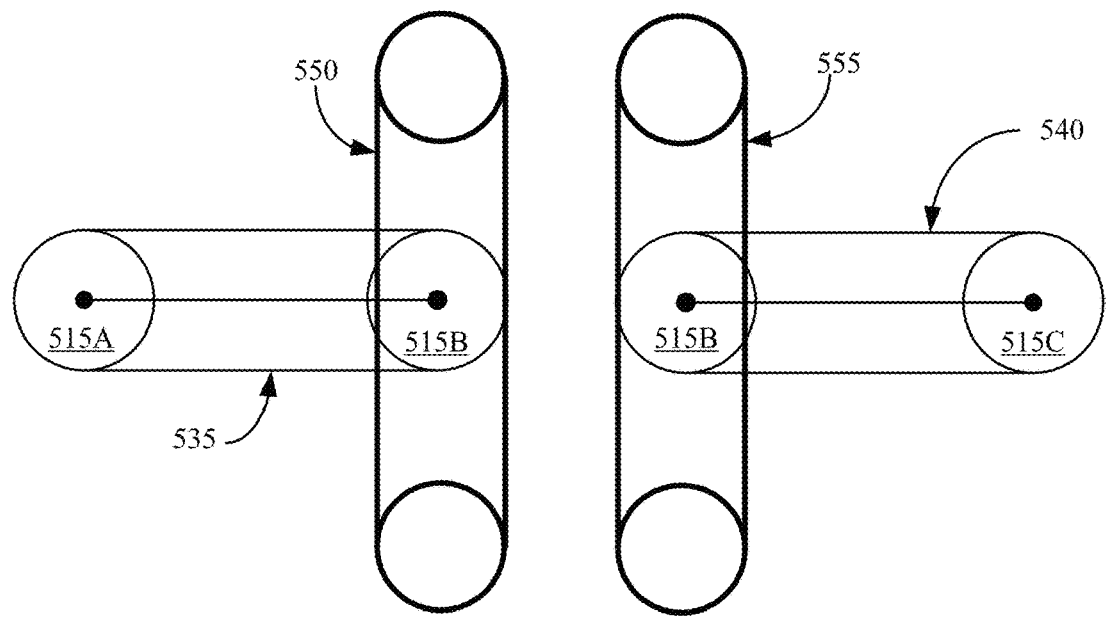

FIGS. 5A-5C illustrate example scenarios of an eraser stroke intersecting an ink stroke at an ink point. In this example, using a UI of a content application, a user may first draw an ink stroke (e.g., ink stroke 505) and then draw an eraser stroke (e.g., eraser stroke 510) through the ink stroke. As can be seen in FIG. 5A, the ink stroke 505 includes a plurality of ink points with adjacent ink points connected by corresponding ink segments. Referring to FIG. 5A, three ink points 515 (e.g., ink point 515A, ink point 515B, and ink point 515C) and two ink segments 520 (ink segment 520A and ink segment 520B) are shown. The ink stroke may be a longer or shorter ink stroke and include more or fewer ink points and ink segments.

In the example scenario, the ink stroke 505 is intersected by the eraser stroke 510 at ink point 515B, as shown in FIG. 5A. The eraser stroke 510 includes a plurality of eraser points with adjacent eraser points connected by corresponding eraser segments. In FIG. 5A, two eraser points 525 (e.g., eraser point 525A and eraser point 525B) and one eraser segment 527 connecting the two eraser points 525 are shown. The eraser stroke may be a longer or a shorter eraser stroke.

Referring to FIG. 5A and FIG. 5B, a visual representation of the ink stroke 505 and the eraser stroke 510 shown in FIG. 5A is provided in FIG. 5B. The visual representation is the representation the user may see on the UI of the content application. In the visual representation, the ink stroke 505 may appear to be cut into two separate ink stroke sections (e.g., section 530A and section 530B) by the eraser stroke 510.

Referring to FIG. 5A and FIG. 5C, an internal representation of the ink stroke 505 and the eraser stroke 510 shown in FIG. 5A is provided in FIG. 5C. The internal representation may be the result of the drying and optional splitting process. The internal representation may be created by updating the ink stroke data based on amount of overlap and location of contact between the ink stroke 505 and the eraser stroke 510, as described in step 435 of FIG. 4. As shown in FIG. 5A, the eraser stroke 510 intersects the ink stroke 505, splitting the ink stroke 505 into two separate ink strokes.

To create the internal representation provided in FIG. 5C, the ink stroke data for the ink stroke 505 is updated. To update the ink stroke data for the ink stroke 505, two sub ink strokes (e.g., a first sub ink stroke 535 and a second sub ink stroke 540) are created and each decorated with an ink divot. The first sub ink stroke 535 represents the ink stroke 505 from one side of the intersection and the second sub ink stroke 540 represents the ink stroke 505 from the other side of the intersection. In this case, the first sub ink stroke 535 represents the ink segment 520A of the ink stroke 505 and the second sub ink stroke 540 represents the ink segment 520B of the ink stroke 505. The drawing has been simplified to show an ink stroke with two ink segments. It should be understood that the ink stroke may be made of many ink points and corresponding ink segments, and that the ink points and ink segments of the portion of the ink stroke at the side of the erasing intersection would be stored as part of the sub ink stroke.

The first sub ink stroke 535 can be created by making a copy of the ink stroke data of the ink stroke 505 from one side of the intersection. The copy of the ink stroke data includes a copy of the required ink points (e.g., ink point 515A and ink point 515B) of the ink stroke 505. An ink divot 550 is generated as a copy of the eraser segment 527 of the eraser stroke 510 that intersects the ink stroke 505.

The second sub ink stroke 540 can be created by making a copy of the ink stroke data of the ink stroke 505 from the other side of the intersection. The copy of the ink stroke data includes a copy of the required ink points (e.g., ink point 515B and ink point 515C) of the ink stroke 505. An ink divot 555 is generated as a copy of the eraser segment 527 of the eraser stroke 510 that intersects the ink stroke 505.

The first sub ink stroke 535 and the second sub ink stroke 540 can be rendered independently.

Figure 6A:
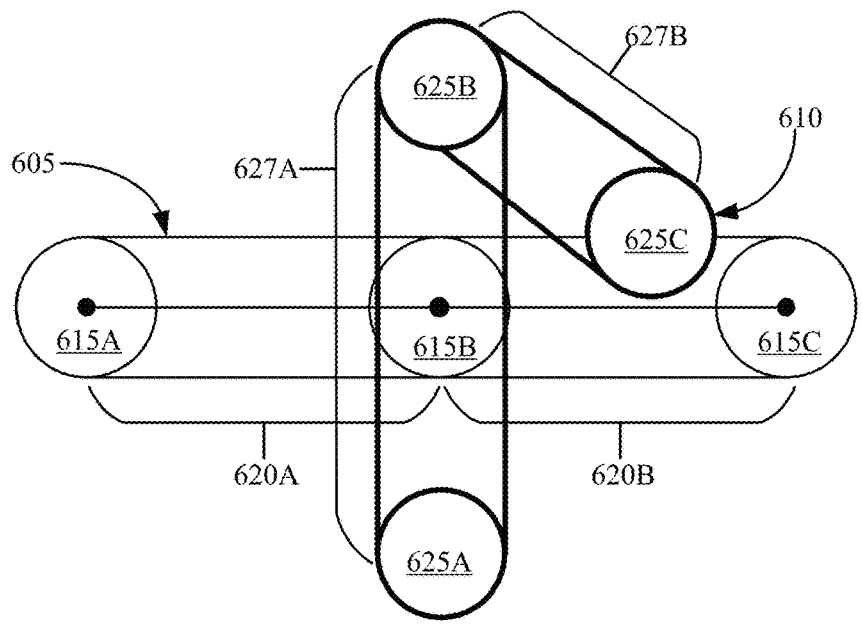
FIGS. 6A-6F illustrate example scenarios of an eraser stroke having a portion intersecting an ink stroke at an ink point as well as another portion overlapping the ink stroke at another part of the ink stroke.

FIGS. 6A-6F illustrate example scenarios of an eraser stroke having a portion intersecting an ink stroke at an ink point as well as another portion overlapping the ink stroke at another part of the ink stroke. In this example, using a UI of a content application, a user may first draw an ink stroke (e.g., ink stroke 605) and then draw an eraser stroke (e.g., eraser stroke 610). As can be seen in FIG. 6A, one eraser segment (e.g., eraser segment 627A) of the eraser stroke 610 intersects the ink stroke 605, while another eraser segment (e.g., eraser segment 627B) of the eraser stroke 610 overlaps a portion of the ink stroke 605 at another part of the ink stroke 605 (e.g., at a second location). The ink stroke 605 includes a plurality of ink points with adjacent ink points connected by corresponding ink segments. Three ink points 615 (e.g., ink point 615A, ink point 615B, and ink point 615C) and two ink segments 620 (e.g., ink segment 620A and ink segment 620B) are shown. The ink stroke may be a longer or shorter ink stroke and include more or fewer ink points and ink segments.

Referring to FIG. 6A, the ink stroke 605 is intersected by an eraser stroke 610 at ink point 615B. The eraser stroke 610 further overlaps the ink stroke 605 at a location in the ink segment 620B. The eraser stroke 610 includes a plurality of eraser points with adjacent eraser points connected by corresponding eraser segments. In FIG. 6A, three eraser points 625 (e.g., eraser point 625A, eraser point 625B, and eraser point 625C) and two eraser segments 627 (e.g., eraser segment 627A and eraser segment 627B) connecting the three eraser points 625 are shown. The eraser stroke may be a longer or a shorter eraser stroke and include more or fewer eraser points and eraser segments.

Figure 6B:
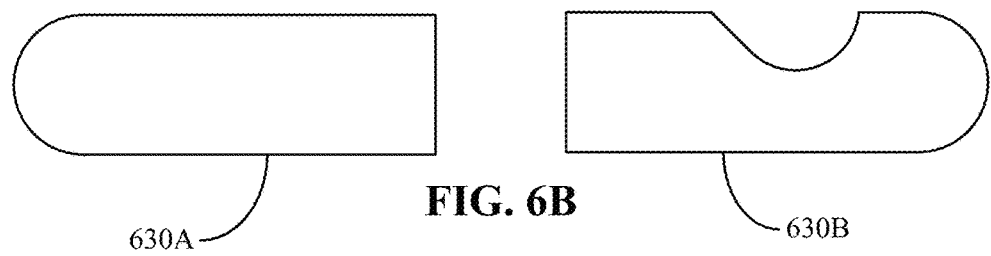

Referring to FIG. 6A and FIG. 6B, a visual representation of the ink stroke 605 and the eraser stroke 610 shown in FIG. 6A is provided in FIG. 6B. The visual representation is the representation the user may see on the UI of the content application. In the visual representation, the ink stroke 605 may appear to be cut into two separate ink stroke sections (e.g., section 630A and section 630B) by the eraser stroke 610. Further, section 630B appears to have a portion removed at the location where the eraser stroke 610 overlapped the ink stroke 605.

Figure 6C:
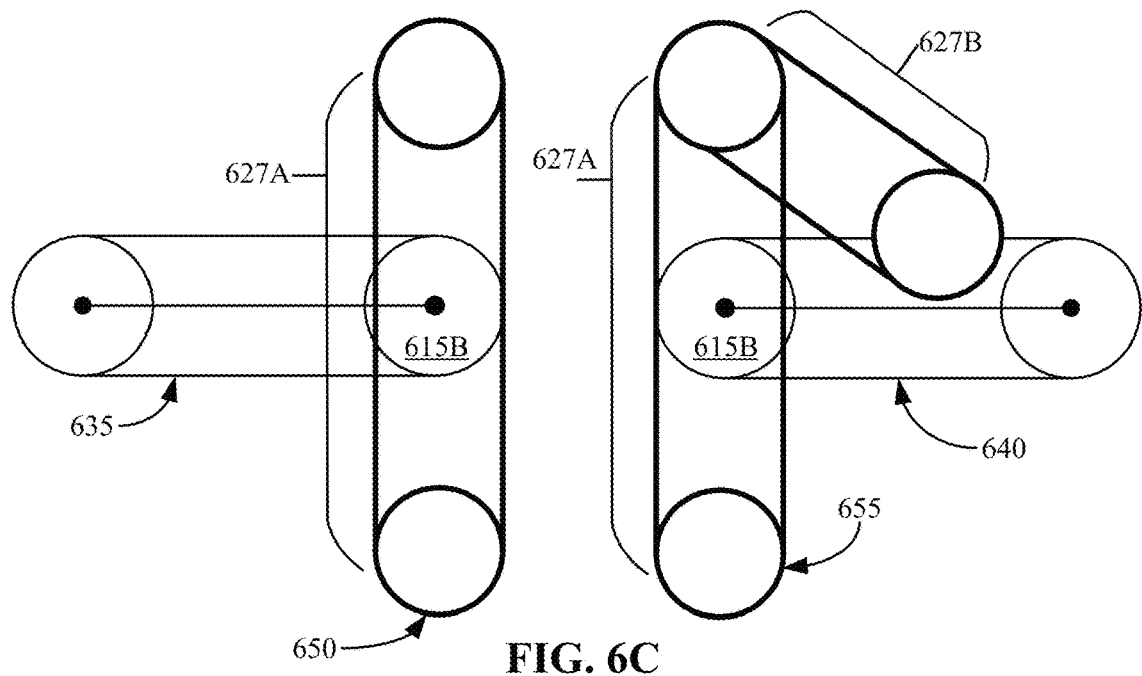

Referring to FIG. 6A and FIG. 6C, an internal representation of the ink stroke 605 and the eraser stroke 610 shown in FIG. 6A is provided in FIG. 6C. The internal representation may be the result of the drying and optional splitting process. The internal representation may be created by updating the ink stroke data based on amount of overlap and location of contact between the ink stroke 605 and the eraser stroke 610, as described in step 435 of FIG. 4. In this example, since, as can be seen in FIG. 6A, the eraser stroke 610 intersects the ink stroke 605, splitting the ink stroke 605 into two separate ink strokes, as well as overlaps a part of the separated ink stroke 605 without intersecting, two sub-ink strokes are created to represent the erased ink stroke for the internal representation.

To create the internal representation provided in FIG. 6C, the ink stroke data for the ink stroke 605 is updated. To update the ink stroke data for the ink stroke 605, two sub ink strokes (e.g., a first sub ink stroke 635 and a second sub ink stroke 640) are created and each are decorated with an ink divot. The first sub ink stroke 635 represents the ink stroke 605 from one side of the intersection and the second sub ink stroke 640 represents the ink stroke 605 from the other side of the intersection. In this case, the first sub ink stroke 635 represents the ink segment 620A of the ink stroke 605 and the second sub ink stroke 640 represents the ink segment 620B of the ink stroke 605. The drawing has been simplified to show an ink stroke with two ink segments. It should be understood that the ink stroke may be made of many ink points and corresponding ink segments, and that the ink points and ink segments of the portion of the ink stroke at the side of the erasing intersection would be stored as part of the sub ink stroke.

The first sub ink stroke 635 can be created by making a copy of the ink stroke data of the ink stroke 605 from one side of the intersection. The copy of the ink stroke data includes the required ink points (e.g., ink point 615A and ink point 615B) of the ink stroke 605. An ink divot 650 is generated as a copy of the eraser segment 627A of the eraser stroke 610 that intersects the ink stroke 605.

The second sub ink stroke 640 can be created by making a copy of the ink stroke data of the ink stroke 605 from the other side of the intersection. The copy of the ink stroke data includes a copy of the required ink points (e.g., ink point 615B and ink point 615C) of the ink stroke 605. Since the required eraser segments (e.g., eraser segment 627A and eraser segment 627B) are adjacent to one another, only one ink divot (e.g., ink divot 655) is created. The ink divot 655 is generated as a copy of the eraser segment 627A and eraser segment 627B of the eraser stroke 610. The first sub ink stroke 635 and the second sub ink stroke 640 can be rendered independently.

Figure 6D:
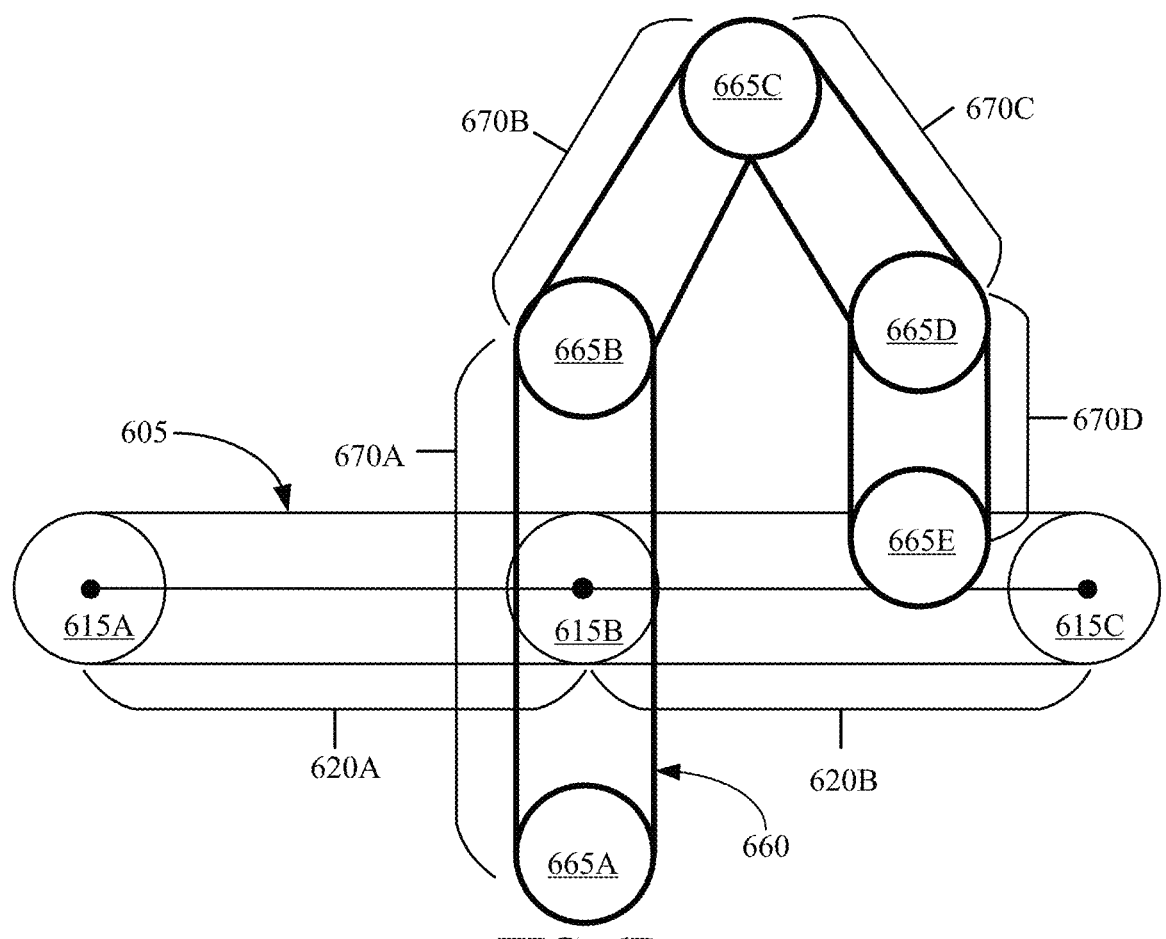

FIG. 6D illustrates a case where the eraser stroke is a longer stroke as compared to that shown in FIG. 6A such that more of an eraser stroke exists before a portion of the eraser stroke overlaps the ink stroke 605 after intersecting the ink stroke at a different location. Referring to FIG. 6D, the ink stroke 605 is intersected by the longer eraser stroke 660 at ink point 615B. The eraser stroke 660 further overlaps the ink stroke 605 at a location in the ink segment 620B. The eraser stroke 660 includes a plurality of eraser points with adjacent eraser points connected by corresponding eraser segments. In FIG. 6D, five eraser points 665 (e.g., eraser point 665A, eraser point 665B, eraser point 665C, eraser point 665D, and eraser point 665E) and four eraser segments 670 (e.g., eraser segment 670A, eraser segment 670B, eraser segment 670C, and eraser segment 670D) connecting the three eraser points 665 are shown. The eraser stroke may be a longer or a shorter eraser stroke and include more or fewer eraser points and eraser segments.

Figure 6E:
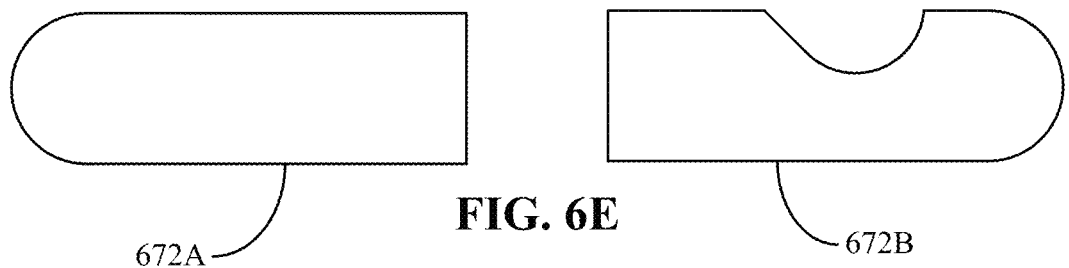

Referring to FIG. 6D and FIG. 6E, a visual representation of the ink stroke 605 and the eraser stroke 660 shown in FIG. 6D is provided in FIG. 6E. The visual representation is the representation the user may see on the UI of the content application. In the visual representation, the ink stroke 605 may appear to be cut into two separate ink stroke sections (e.g., section 672A and section 672B) by the eraser stroke 660. Further, section 672B appears to have a portion removed at the location where the eraser stroke 660 overlapped the ink stroke 605. This visual representation looks similar to that of the case shown in FIG. 6B except the internal representation of the erased stroke is different, as is shown in FIG. 6F.

Figure 6F:
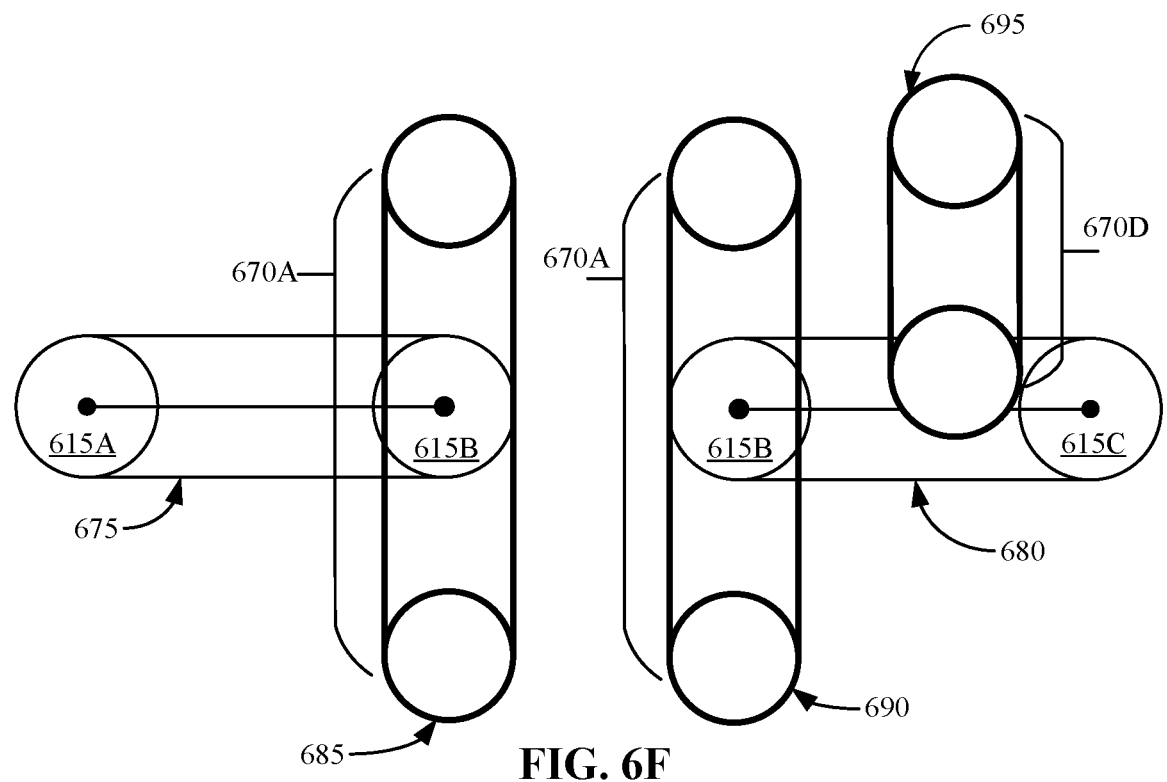

Referring to FIG. 6D and FIG. 6F, an internal representation of the ink stroke 605 and the eraser stroke 660 shown in FIG. 6D is provided in FIG. 6F. The internal representation may be the result of the drying and optional splitting process. The internal representation may be created by updating the ink stroke data based on amount of overlap and location of contact between the ink stroke 605 and the eraser stroke 660, as described in step 435 of with respect to FIG. 4. In this example, since, as can be seen in FIG. 6D, the eraser stroke 660 intersects the ink stroke 605, splitting the ink stroke 605 into two separate ink strokes, as well as overlaps a part of the separated ink stroke 605 without intersecting, two sub-ink strokes are created to represent the erased ink stroke for the internal representation.

To create the internal representation provided in FIG. 6F, the ink stroke data for the ink stroke 605 is updated. To update the ink stroke data for the ink stroke 605, two sub ink strokes (e.g., a first sub ink stroke 675 and a second sub ink stroke 680) are created and each are decorated with one or more ink divots. The first sub ink stroke 675 represents the ink stroke 605 from one side of the intersection and the second sub ink stroke 680 represents the ink stroke 605 from the other side of the intersection. In this case, the first sub ink stroke 675 represents the ink segment 620A of the ink stroke 605 and the second sub ink stroke 1680 represents the ink segment 620B of the ink stroke 605. The drawing has been simplified to show an ink stroke with two ink segments. It should be understood that the ink stroke may be made of many ink points and corresponding ink segments, and that the ink points and ink segments of the portion of the ink stroke at the side of the erasing intersection would be stored as part of the sub ink stroke.

The first sub ink stroke 675 can be created by making a copy of the ink stroke data of the ink stroke 605 from one side of the intersection. The copy of the ink stroke data includes the required ink points (e.g., ink point 615A and ink point 615B) of the ink stroke 605. An ink divot 685 in generated as a copy of the eraser segment 670A of the eraser stroke 660 that intersects the ink stroke 605.

The second sub ink stroke 1680 can be created by making a copy of the ink stroke data of the ink stroke 605 from the other side of the intersection. The copy of the ink stroke data includes a copy of the required ink points (e.g., ink point 615B and ink point 615C) of the ink stroke 605. Since the required eraser segments (e.g., eraser segment 670A and eraser segment 670D) are not adjacent to one another, two ink divots (e.g., ink divot 1690 and ink divot 695) are created instead of a single ink divot. The first ink divot (e.g., ink divot 1690) is generated as a copy of the eraser segment 670A of the eraser stroke 660. The second ink divot (e.g., ink divot 1695) is generated as a copy of the eraser segment 670D of the eraser stroke 660. The first sub ink stroke 675 and the second sub ink stroke 680 can be rendered independently.

In this case (where the eraser stroke intersects the ink stroke at a first ink point, appearing to split the ink stroke into two separate ink strokes, and the eraser stroke overlaps the ink stroke at a second location without intersecting the ink stroke, where the eraser stroke contacts the ink stroke with two eraser segments that are not adjacent to each other), for a method of enhanced erasing of digital ink, updating ink stroke data based on an amount of overlap and location of contact between the eraser stroke (considered to have eraser stroke data including a set of eraser points, where two adjacent eraser points are connected by an eraser segment) and the ink stroke (considered to have ink stroke data including a set of ink points, where two adjacent ink points are connected by a corresponding ink segment), can include creating a first sub ink stroke by making a copy of the ink stroke data from one side of the intersection and including a first copy of the first ink point, and generating a first ink divot comprising a copy of the eraser segment that intersects the ink stroke at the first ink point; and creating a second sub ink stroke by making a copy of the ink stroke data from the other side of the intersection and including a second copy of the first ink point, the other side of the intersection having the second location, generating a second ink divot comprising a copy of the eraser segment that intersects the ink stroke at the first ink point and a copy of the eraser segment that overlaps the ink stroke at the second location.

Figure 7A:
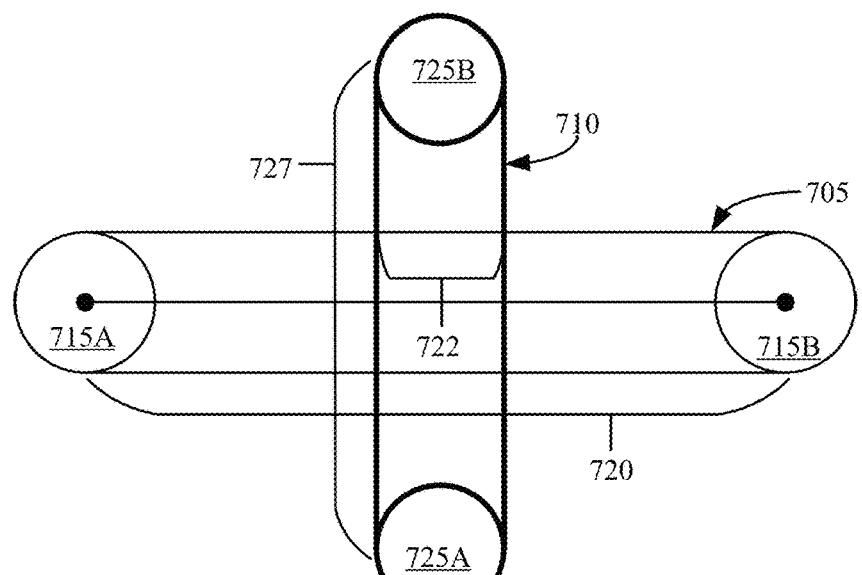
FIGS. 7A-7C illustrate example scenarios of an eraser stroke intersecting an ink stroke between two ink points.
Figure 7B:
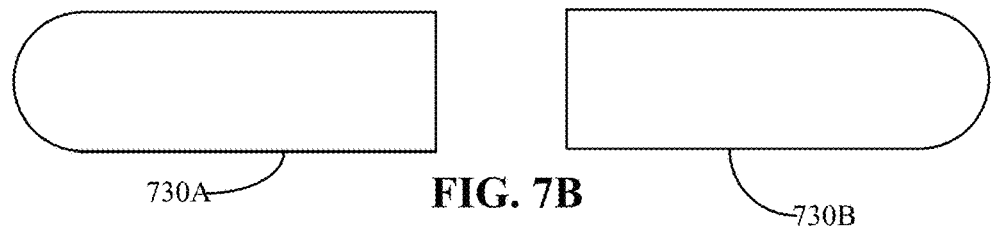
Figure 7C:
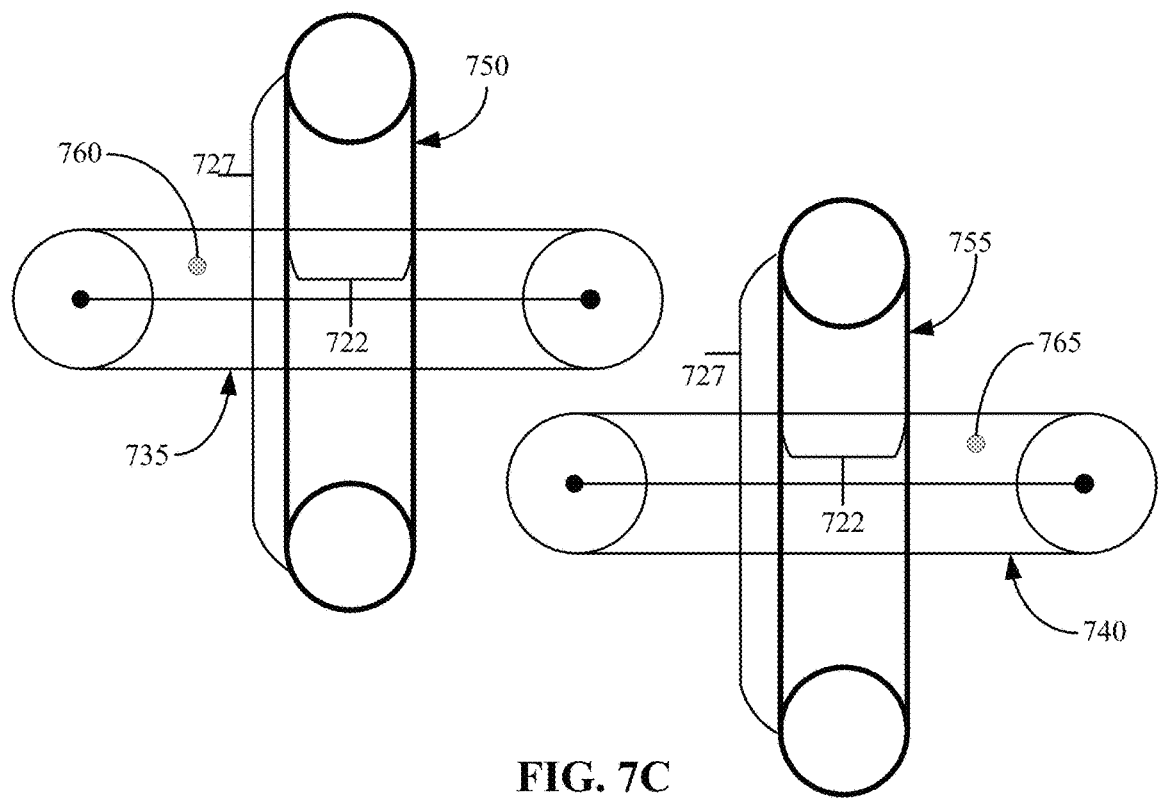

FIGS. 7A-7C illustrate example scenarios of an eraser stroke intersecting an ink stroke between two ink points. In this example, using a UI of a content application, a user may first draw an ink stroke 705 and then draw an eraser stroke 710 that goes through the ink stroke 705, as can be seen in FIG. 7A. The ink stroke 705 includes a plurality of ink points with adjacent ink points connected by corresponding ink segments. Referring to FIG. 7A, two ink points 715 (e.g., ink point 715A and ink point 715B) and one ink segment 720 are shown. The ink stroke may be a longer or shorter ink stroke and include more or fewer ink points and ink segments.

In the example scenario, the ink stroke 705 is intersected by the eraser stroke 710 at a location 722 between the two ink points 715. The eraser stroke 710 includes a plurality of eraser points with adjacent eraser points connected by corresponding eraser segments. In FIG. 7A, two eraser points 725 (e.g., eraser point 725A and eraser point 725B) and one eraser segment 727 connecting the two eraser points 725 are shown. The eraser stroke may be a longer or a shorter eraser stroke and include more or fewer eraser points and eraser segments.

Referring to FIG. 7A and FIG. 7B, a visual representation of the ink stroke 705 and the eraser stroke 710 shown in FIG. 7A is provided in FIG. 7B. The visual representation is the representation the user may see on the UI of the content application. In the visual representation, the ink stroke 705 may appear to be cut into two separate ink stroke sections 730 (e.g., section 730A and section 730B) by the eraser stroke 710. The two separate ink stroke sections 730 are each a portion of the single ink segment 720 that remain after the eraser stroke 710 intersects the ink stroke 705.

Referring to FIG. 7A and FIG. 7C, an internal representation of the ink stroke 705 and the eraser stroke 710 shown in FIG. 7A is provided in FIG. 7C. The internal representation may be the result of the drying and optional splitting process. The internal representation may be created by updating the ink stroke data based on amount of overlap and location of contact between the ink stroke 705 and the eraser stroke 710, as described in step 435 of FIG. 4. As can be seen in FIG. 7A, the eraser stroke 710 intersects the ink stroke 705, splitting the ink segment 720 of the ink stroke 705 into two separate ink strokes. Since the eraser stroke 710 intersects the ink stroke 705 between two ink points, the internal representation may require that each sub ink stroke include both the ink points.

To create the internal representation provided in FIG. 7C, the ink stroke data for the ink stroke 705 is updated. To update the ink stroke data for the ink stroke 705, two sub ink strokes (e.g., a first sub ink stroke 735 and a second sub ink stroke 740) are created and each are decorated with an ink divot. The first sub ink stroke 735 can be created by making a copy of the ink stroke data from the ink stroke 705. An ink divot 750 can be generated as a copy of the eraser segment 727 of the eraser stroke 710 that intersects the ink stroke 705 at location 722.

In this scenario, an additional piece of data is required when creating the two sub ink strokes. The additional piece of data is needed when an erase stroke splits an ink stroke in such a way that after removing unneeded ink stroke segments and areas covered by ink divots there are still some remaining disconnected areas (which are not part of the given sub ink stroke). To differentiate the desired area from any others, the aforementioned single (x, y) coordinate within the correct area's geometry is recorded.

For the first sub ink stroke 735, a coordinate point 760 can be assigned to a location on one side of the intersected location 722. As previously discussed, the coordinate point 760 can be a single (x,y) coordinate assigned to any location within the desired section's geometry to differentiate the desired area from any others. In this case, the coordinate point 760 is assigned to the left side of the ink stroke 705.

The second sub ink stroke 740 can be created by making another copy of the ink stroke data from the ink stroke 705. An ink divot 755 can be generated as a copy of the eraser segment 727 of the eraser stroke 710 that intersects the ink stroke 705 at location 722.

For the second sub ink stroke 740, a coordinate point 765 can be assigned to a location on the other side of the intersected location 722. As previously discussed, the coordinate point 765 can be a single (x,y) coordinate assigned to any location within the desired section's geometry to differentiate the desired area from any others. In this case, the coordinate point 765 is assigned to the right side of the ink stroke 705.

In this case, each sub ink stroke (e.g., the first sub ink stroke 735 and the second sub ink stroke 740) has the same set of ink points and the same ink divot, but each sub ink stroke has a different (x, y) coordinate (coordinate point) differentiating them.

In this case, since ink stroke 705 has only one ink segment (e.g., ink segment 720), each sub ink stroke includes only that ink segment. The first sub ink stroke 735 represents the ink segment 720 of the ink stroke 705 from one side of the intersection location 722 and the second sub ink stroke 740 represents the ink segment 720 of the ink stroke 705 from the other side of the intersection location 722. The drawing has been simplified to show an ink stroke with a single ink segment. It should be understood that the ink stroke may be made of many ink points and corresponding ink segments, and that the ink points and ink segments of the portion of the ink stroke at the side of the erasing intersection would be stored as part of the sub ink stroke.

At the time of rendering the ink stroke, a geometry mask is generated that excludes all portions of the ink segment 720 except the one containing the coordinate point. Similarly, at hit-testing time, the generated ink stroke geometry includes only the ink segment portion containing the coordinate point.

Figure 8A:
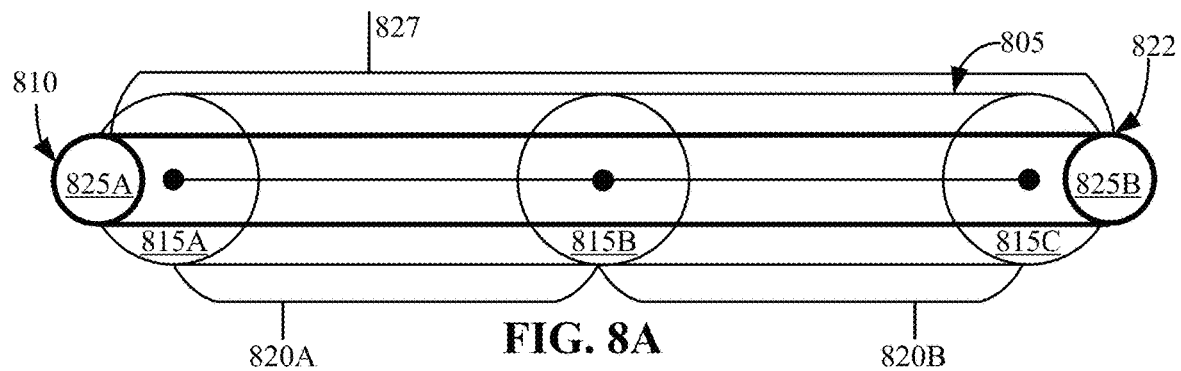
FIGS. 8A-8C illustrate example scenarios of an eraser stroke intersecting an ink stroke lengthwise.
Figure 8B:
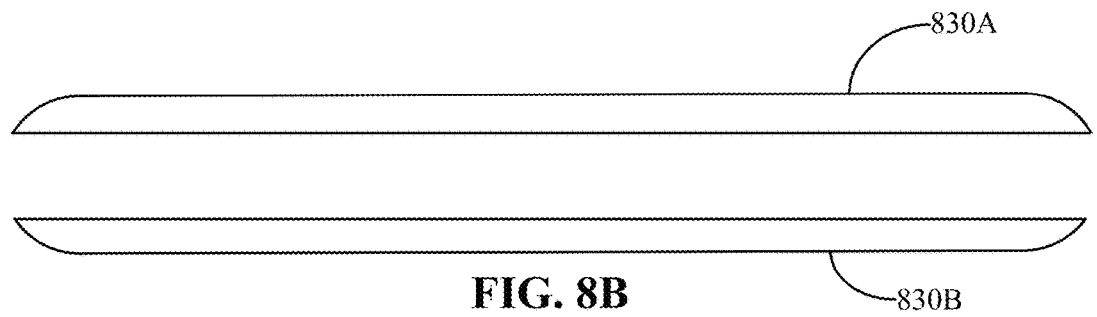
Figure 8C:
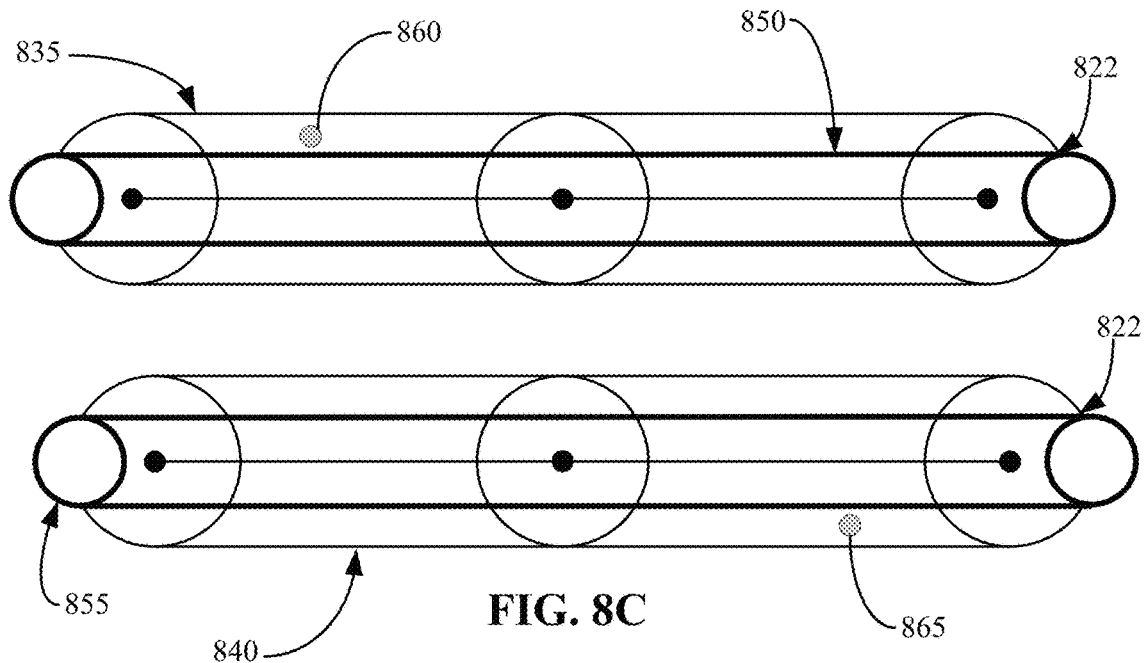

FIGS. 8A-8C illustrate example scenarios of an eraser stroke intersecting an ink stroke lengthwise. In this example, using a UI of a content application, a user may first draw an ink stroke 805 and then draw an eraser stroke 810 that goes through the ink stroke 805 lengthwise, as shown in FIG. 8A. The ink stroke 805 includes a plurality of ink points with adjacent ink points connected by corresponding ink segments. Referring to FIG. 8A, three ink points 815 (e.g., ink point 815A, ink point 815B, and ink point 815C) and two ink segments 820 (e.g., ink segment 820A and ink segment 820B) are shown. The ink stroke may be a longer or shorter ink stroke and include more or fewer ink points and ink segments.

In the example scenario, the ink stroke 805 is intersected by the eraser stroke 810 lengthwise through the ink stroke 805 at location 822. The eraser stroke 810 includes a plurality of eraser points with adjacent eraser points connected by corresponding eraser segments. In FIG. 8A, two eraser points 825 (e.g., eraser point 825A and eraser point 825B) and one eraser segment 827 connecting the two eraser points 825 are shown. The eraser stroke may be a longer or a shorter eraser stroke and include more or fewer eraser points and eraser segments.

Referring to FIG. 8A and FIG. 8B, a visual representation of the ink stroke 805 and the eraser stroke 810 shown in FIG. 8A is provided in FIG. 8B. The visual representation is the representation the user may see on the UI of the content application. In the visual representation, the ink stroke 805 may appear to be cut into two separate ink stroke sections 830 (e.g., section 830A and section 830B) by the eraser stroke 810. The two separate ink stroke sections 830 are each a portion of the ink segments 820 that remain after the eraser stroke 810 intersects the ink stroke 805 lengthwise.

Referring to FIG. 8A and FIG. 8C, an internal representation of the ink stroke 805 and the eraser stroke 810 shown in FIG. 8A is provided in FIG. 8C. The internal representation may be the result of the drying and optional splitting process. The internal representation may be created by updating the ink stroke data based on amount of overlap and location of contact between the ink stroke 805 and the eraser stroke 810, as described in step 435 of FIG. 4. As can be seen in FIG. 8A, the eraser stroke 810 intersects the ink stroke 805 lengthwise, splitting the ink segments 820 of the ink stroke 805 into two separate ink strokes.

To create the internal representation provided in FIG. 8C, the ink stroke data for the ink stroke 805 is updated. To update the ink stroke data for the ink stroke 805, two sub ink strokes (e.g., a first sub ink stroke 835 and a second sub ink stroke 840) are created and each are decorated with an ink divot. The first sub ink stroke 835 can be created by making a copy of the ink stroke data from the ink stroke 805. An ink divot 850 can be generated as a copy of the eraser segment 827 of the eraser stroke 810 that intersects the ink stroke 805.

In this scenario, an additional piece of data is required when creating the two sub ink strokes. The additional piece of data is needed when an erase stroke splits an ink stroke in such a way that after removing unneeded ink stroke segments and areas covered by ink divots there are still some remaining disconnected areas (which are not part of the given sub ink stroke). To differentiate the desired area from any others, the aforementioned single (x, y) coordinate within the correct area's geometry is recorded.

For the first sub ink stroke 835, a coordinate point 860 can be assigned to a location on one side of the intersected location 822. As previously discussed, the coordinate point 860 can be a single (x,y) coordinate assigned to any location within the desired section's geometry to differentiate the desired area from any others. In this case, the coordinate point 860 is assigned to the top half of the ink stroke 805.

The second sub ink stroke 840 can be created by making another copy of the ink stroke data from the ink stroke 805. An ink divot 855 can be generated as a copy of the eraser segment 827 of the eraser stroke 810 that intersects the ink stroke 805.

For the second sub ink stroke 840, a coordinate point 865 can be assigned to a location on the other side of the intersected location 822. As previously discussed, the coordinate point 865 can be a single (x,y) coordinate assigned to any location within the desired section's geometry to differentiate the desired area from any others. In this case, the coordinate point 865 is assigned to the bottom half of the ink stroke 805.

In this case, each sub ink stroke (e.g., the first sub ink stroke 835 and the second sub ink stroke 840) is a copy of the whole ink stroke 805. Therefore, each sub stroke has the same set of ink points and the same ink divot, but each sub ink stroke has a different (x, y) coordinate (coordinate point) differentiating them. The drawing has been simplified to show an ink stroke with two ink segments. It should be understood that the ink stroke may be made of many ink points and corresponding ink segments, and that the ink points and ink segments of the portion of the ink stroke at the side of the erasing intersection would be stored as part of the sub ink stroke.

The first sub ink stroke 835 represents the ink stroke 805 from one side of the intersection location and the second sub ink stroke 840 represents the ink stroke 805 from the other side of the intersection location. At the time of rendering the ink stroke, a geometry mask is generated that excludes all portions of the ink segment segments 820 except the one containing the coordinate point. Similarly, at hit-testing time, the generated ink stroke geometry includes only the ink segment portion containing the coordinate point.

Figure 9A:
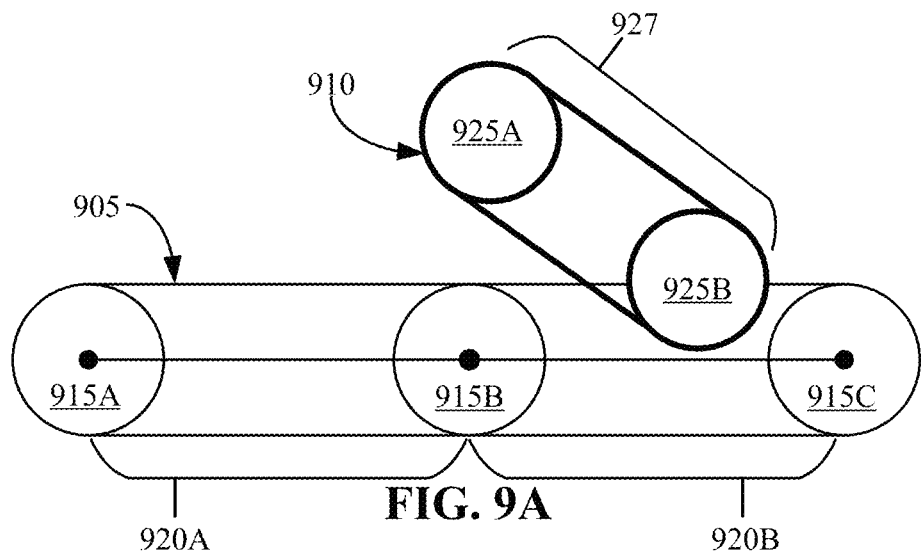
FIGS. 9A-9C illustrate example scenarios of an eraser stroke overlapping an ink stroke.
Figure 9B:
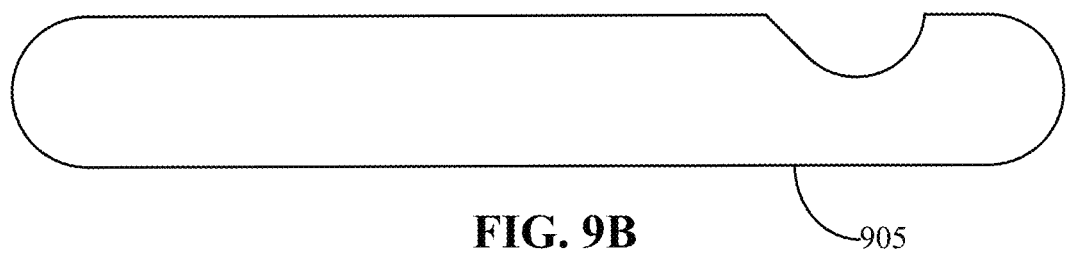
Figure 9C:
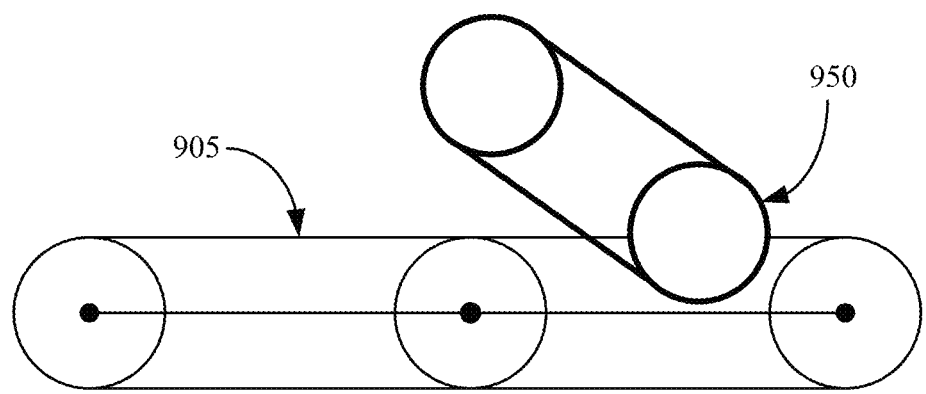

FIGS. 9A-9C illustrate an example scenario of an eraser stroke overlapping an ink stroke. In this example, using a UI of a content application, a user may first draw an ink stroke 905 and then draw an eraser stroke 910 that overlaps the ink stroke 905, but does not intersect the ink stroke 905, as shown in FIG. 9A. The ink stroke 905 includes a plurality of ink points with adjacent ink points connected by corresponding ink segments. Referring to FIG. 9A, three ink points 915 (e.g., ink point 915A, ink point 915B, and ink point 915C) and two ink segments 920 (e.g., ink segment 920A and ink segment 920B) are shown. The ink stroke may be a longer or shorter ink stroke and include more or fewer ink points and ink segments.

In the example scenario, the ink stroke 905 is overlapped by the eraser stroke 910, while not being intersected. The eraser stroke 910 includes a plurality of eraser points with adjacent eraser points connected by corresponding eraser segments. In FIG. 9A, two eraser points 925 (e.g., eraser point 925A and eraser point 925B) and one eraser segment 927 connecting the two eraser points 925 are shown. The eraser stroke may be a longer or a shorter eraser stroke and include more or fewer eraser points and eraser segments.

Referring to FIG. 9A and FIG. 9B, a visual representation of the ink stroke 905 and the eraser stroke 910 shown in FIG. 9A is provided in FIG. 9B. The visual representation is the representation the user may see on the UI of the content application. In the visual representation, the ink stroke 905 may appear to have a portion erased by the eraser stroke 910.

Referring to FIG. 9A and FIG. 9C, an internal representation of the ink stroke 905 and the eraser stroke 910 shown in FIG. 9A is provided in FIG. 9B. The internal representation may be the result of the drying and optional splitting process. The internal representation may be created by updating the ink stroke data based on amount of overlap and location of contact between the ink stroke 905 and the eraser stroke 910, as described in step 435 of FIG. 4. As can be seen in FIG. 9A, the eraser stroke 910 overlaps the ink stroke 905 without intersecting the ink stroke 905.

To create the internal representation provided in FIG. 9C, the ink stroke data for the ink stroke 905 is updated. To update the ink stroke data for the ink stroke 905, an ink divot 950 can be generated as a copy of the eraser segment 927 of the eraser stroke 910 that overlaps the ink stroke 905.

Figure 10A:
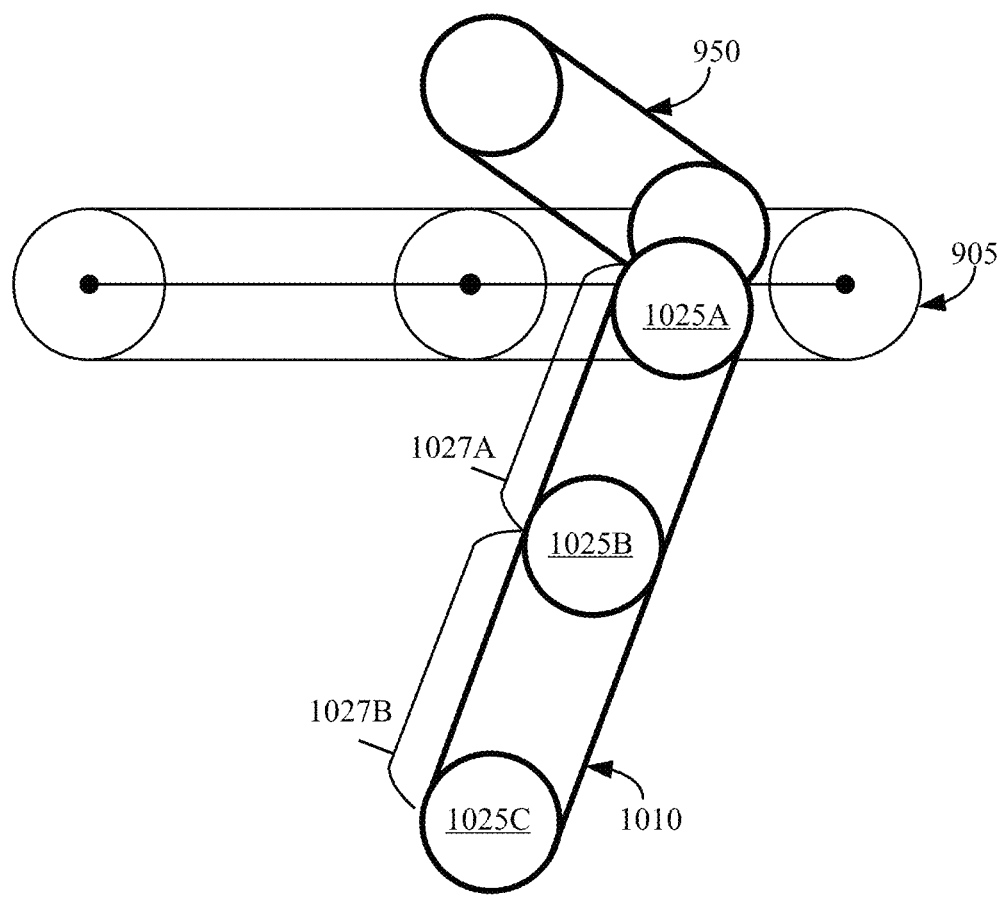
FIGS. 10A-10C illustrate example scenarios of an eraser stroke overlapping an ink stroke at the same location of a previous eraser stroke overlap.
Figure 10B:
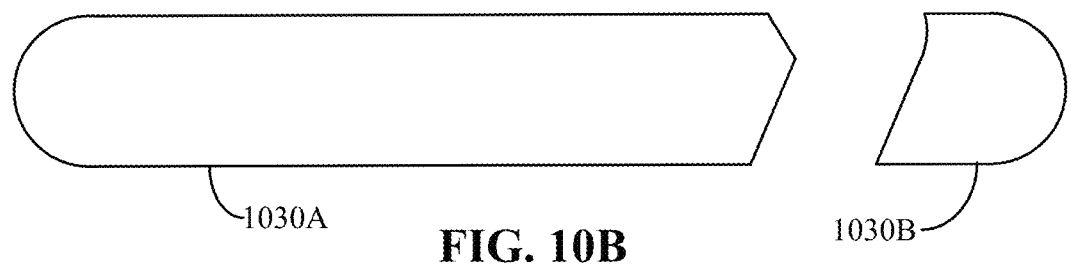
Figure 10C:
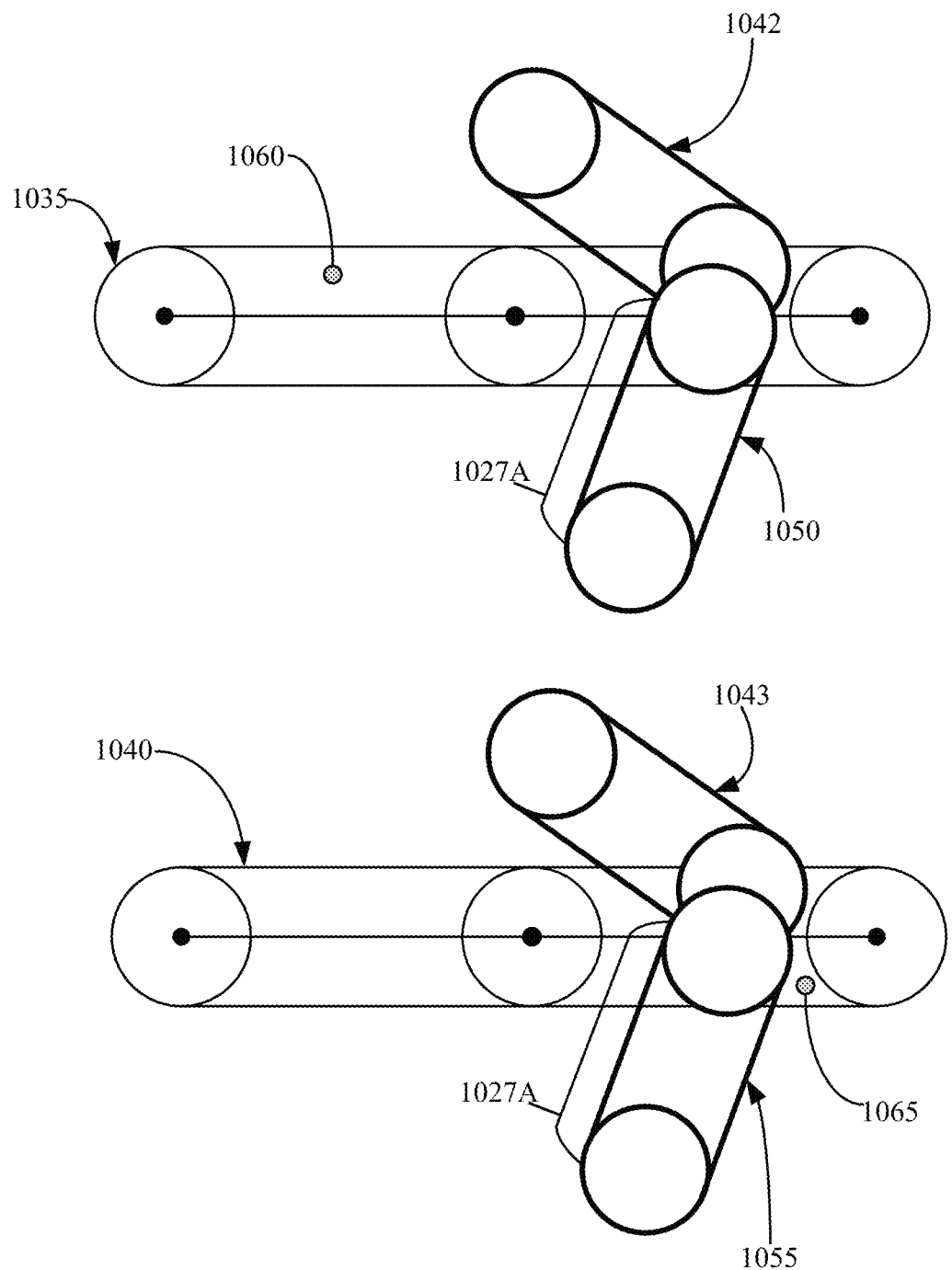

FIGS. 10A-10C illustrate an example scenario of an eraser stroke overlapping an ink stroke at the same location of a previous eraser stroke overlap. In this example, using a UI of a content application, a user may have drawn an eraser stroke (e.g., eraser stroke 1010) that overlaps an ink stroke that already has an ink divot, such as ink stroke 905 with ink divot 950 as described in FIG. 9C. As can be seen in FIG. 10A, the eraser stroke 1010 overlaps the ink stroke 905 at the location of the ink divot 950. While the ink divot 950 and eraser stroke 1010, independently, do not intersect the ink stroke 905, the combination of the ink divot 950 and the eraser stroke 1010 creates an intersection of the ink stroke 905, appearing to split the ink stroke 905 into two segments.

The eraser stroke 1010 includes a plurality of eraser points with adjacent eraser points connected by corresponding eraser segments. Referring to FIG. 10A, three eraser points 1025 (e.g., eraser point 1025A, eraser point 1025B, and eraser point 1025C) and two eraser segments 1027 (e.g., eraser segment 1027A and eraser segment 1027B) connecting the three eraser points 1025 are shown. The eraser stroke may be a longer or a shorter eraser stroke and include more or fewer eraser points and eraser segments.

Referring to FIG. 10A and FIG. 10B, a visual representation of the ink stroke 905 with the ink divot 950 and the eraser stroke 1010 shown in FIG. 10A is provided in FIG. 10B. The visual representation is the representation the user may see on the UI of the content application. In the visual representation, the ink stroke 905 with the ink divot 950 may appear to be cut into two separate ink stroke sections 1030 (e.g., section 1030A and section 1030B) by the eraser stroke 1010. The two separate ink stroke sections 1030 are each a portion of the ink stroke 905 that remain after the eraser stroke 1010 and ink divot 950 intersect.

Referring to FIG. 10A and FIG. 10C, an internal representation of the ink stroke 905 with the ink divot 950 and the eraser stroke 1010 shown in FIG. 10A is provided in FIG. 10C. The internal representation may be the result of the drying and optional splitting process. The internal representation may be created by updating the ink stroke data based on amount of overlap and location of contact between the ink stroke 905 and the eraser stroke 1010, as described in step 435 of FIG. 4. As shown in FIG. 10A, the eraser stroke 1010 overlaps the ink stroke 905 at the location of the ink divot 950, splitting the ink stroke 905 into two separate ink strokes.

To create the internal representation provided in FIG. 10C, the ink stroke data for the ink stroke 905 is updated. To update the ink stroke data for the ink stroke 905, two sub ink strokes (e.g., a first sub ink stroke 1035 and a second sub ink stroke 1040) are created and each are decorated with one or more ink divots. The first sub ink stroke 1035 can be created by making a copy of the ink stroke data from the ink stroke 905. The copy of the ink stroke data can include a copy of the ink divot 950 (e.g., ink divot 1042). Another ink divot 1050 can be generated as a copy of the eraser segment (e.g., eraser segment 1027A) of the eraser stroke 1010 that overlaps the ink stroke 905 to create the intersection with the ink divot 950. Since, as shown in FIG. 10A, eraser segment 1027B does not contact the ink stroke 905, the eraser segment 1027B can be discarded.

In this scenario, an additional piece of data is required when creating the two sub ink strokes. The additional piece of data is needed when an erase stroke splits an ink stroke in such a way that after removing unneeded ink stroke segments and areas covered by ink divots there are still some remaining disconnected areas (which are not part of the given sub ink stroke). To differentiate the desired area from any others, the aforementioned single (x, y) coordinate within the correct area's geometry is recorded.

For the first sub ink stroke 1035, a coordinate point 1060 can be assigned to a location on one side of the location of the intersection. As previously discussed, the coordinate point 1060 can be a single (x,y) coordinate assigned to any location within the desired section's geometry to differentiate the desired area from any others. In this case, the coordinate point 1060 is assigned to the left side of the location of the intersection on the first sub ink stroke 1035.

The second sub ink stroke 1040 can be created by making another copy of the ink stroke data from the ink stroke 905. The copy of the ink stroke data can include a copy of the ink divot 950 (e.g., ink divot 1043). Another ink divot 1055 can be generated as a copy of the eraser segment (e.g., eraser segment 1027A) of the eraser stroke 1010 that overlaps the ink stroke 905 to create the intersection with the ink divot 950. Since, as shown in FIG. 10A, eraser segment 1027B does not contact the ink stroke 905, the eraser segment 1027B can be discarded.

For the second sub ink stroke 1040, a coordinate point 1065 can be assigned to a location on the other side of the intersected location. As previously discussed, the coordinate point 1065 can be a single (x,y) coordinate assigned to any location within the desired section's geometry to differentiate the desired area from any others. In this case, the coordinate point 1065 is assigned to the right side of the location of the intersection on the second sub ink stroke 1040.

In this case, each sub ink stroke (e.g., the first sub ink stroke 1035 and the second sub ink stroke 1040) shown in FIG. 10C is a copy of the entire ink stroke 905 shown in FIG. 10A. Therefore, each sub ink stroke has the same set of ink points and the same divots, but each sub ink stroke has a different (x, y) coordinate (coordinate point) differentiating them. The drawing has been simplified to show an ink stroke with two ink segments. It should be understood that the ink stroke may be made of many ink points and corresponding ink segments, and that the ink points and ink segments of the portion of the ink stroke at the side of the erasing intersection would be stored as part of the sub ink stroke.

The first sub ink stroke 1035 represents the ink stroke 905 from one side of the intersection location and the second sub ink stroke 1040 represents the ink stroke 905 from the other side of the intersection location. At the time of rendering the ink stroke, a geometry mask is generated that excludes all portions of the ink stroke 905 except the one containing the coordinate point. Similarly, at hit-testing time, the generated ink stroke geometry includes only the ink segment portion containing the coordinate point.

In some cases, there may be a scenario where the system can recognize that there are two ink divots included in the sub ink strokes (e.g., ink divot 1042 and ink divot 1050 in the first sub ink stroke 1035 and ink divot 1042 and ink divot 1055 in the second sub ink stroke 1040). In this case, the two ink divots may be replaced with a single ink divot.

Figure 11A:
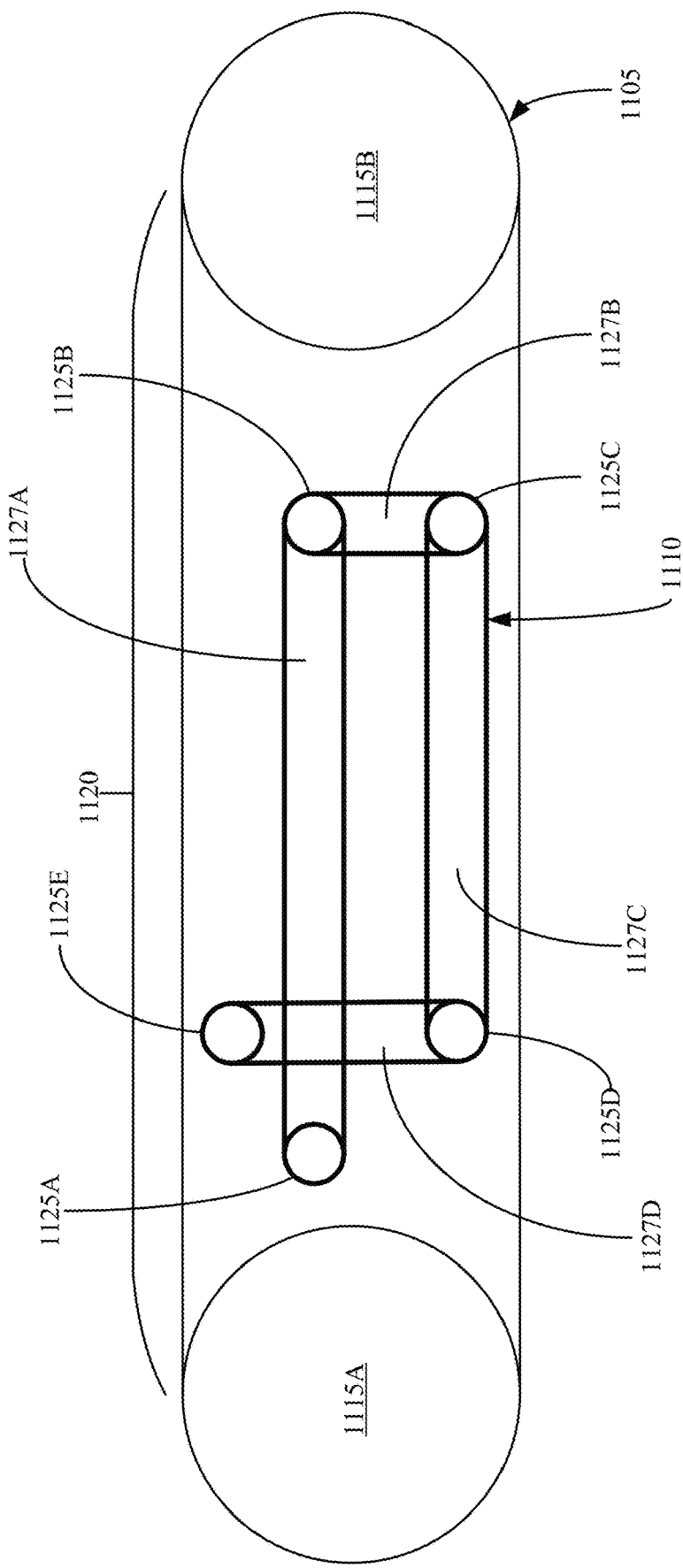
FIGS. 11A-11C illustrate example scenarios of an eraser stroke creating a ring-shaped cut out of an ink stroke.
Figure 11B:
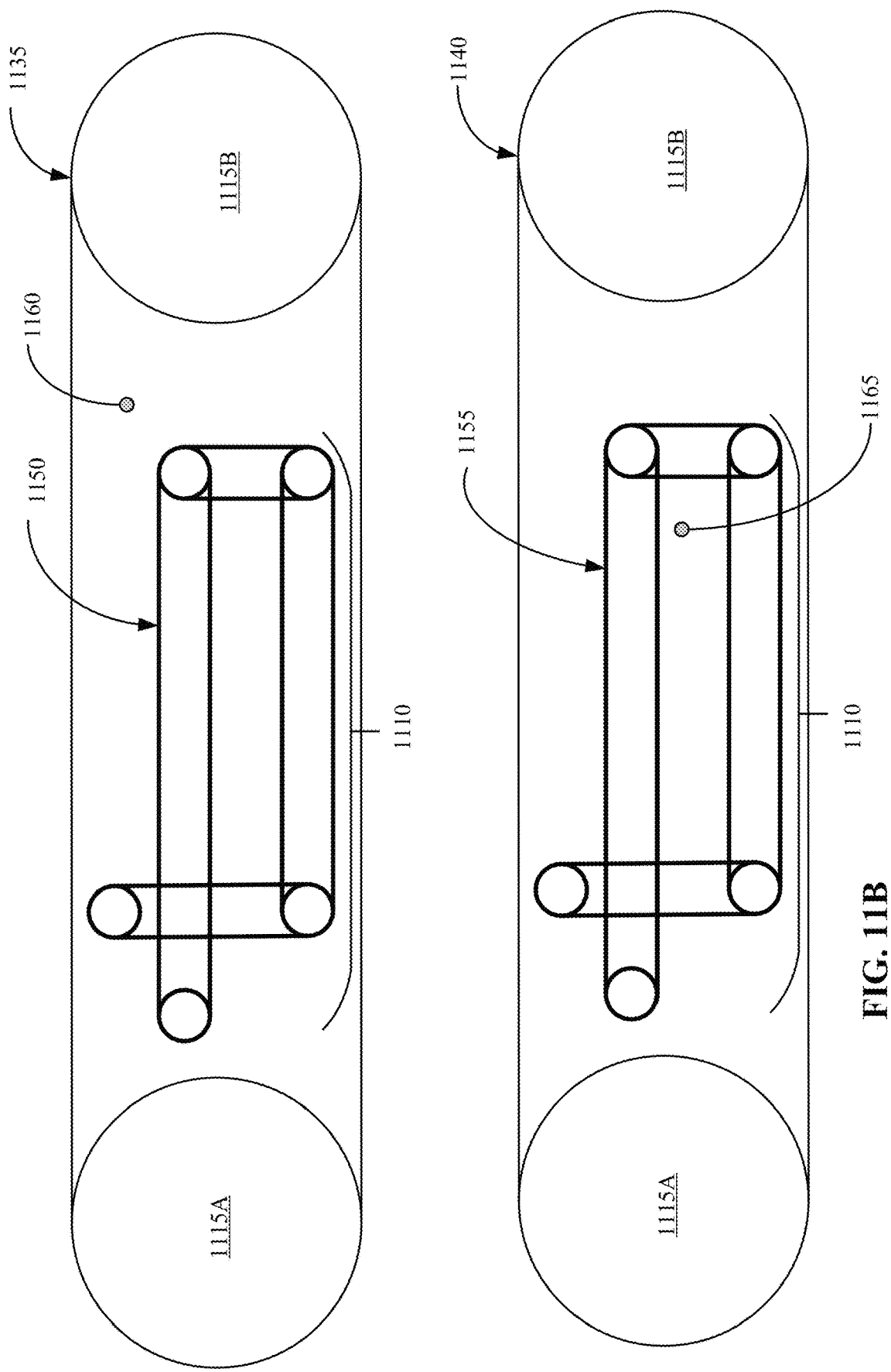
Figure 11C:
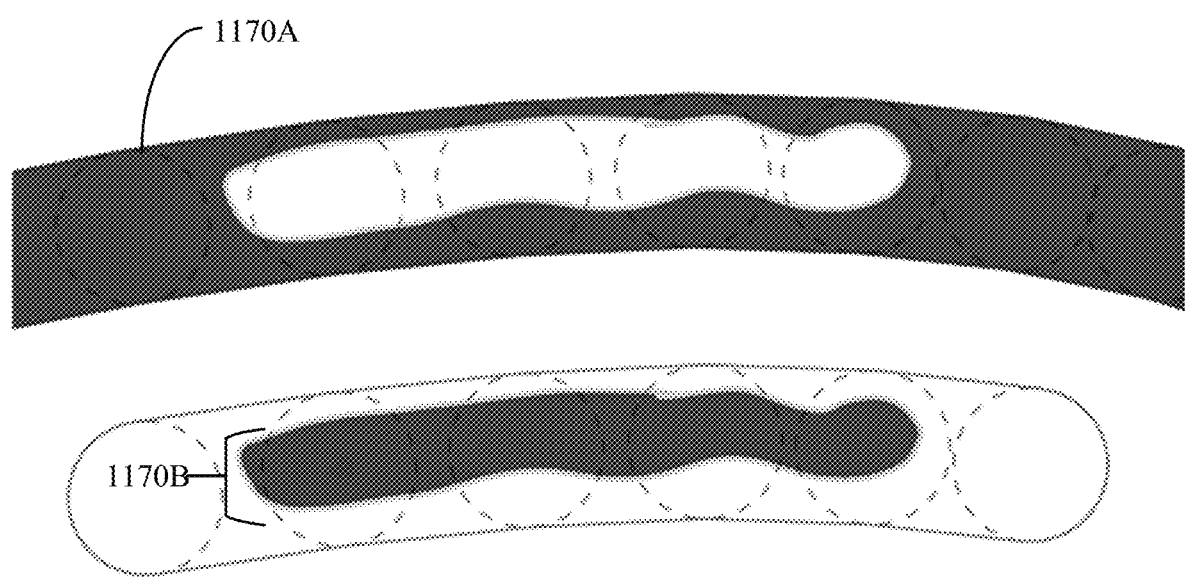

FIGS. 11A-11C illustrate example scenarios of an eraser stroke creating a ring-shaped cut out of an ink stroke. This scenario may only be possible when the eraser stroke is substantially smaller than the ink stroke. In this example, an eraser stroke 1110 cuts out a middle portion of an ink stroke 1105, as can be seen in FIG. 11A. The ink stroke 1105 includes a plurality of ink points with adjacent ink points connected by corresponding ink segments. Referring to FIG. 11A, two ink points 1115 (e.g., ink point 1115A and ink point 1115B) and one ink segment 1120 are shown. However, the ink stroke may be a longer or shorter ink stroke and include more or fewer ink points and ink segments. For example, FIG. 11C shows the eraser stroke creating a ring/cut-out over four ink points of the ink stroke.

In the example scenario, the eraser stroke 1110 cuts out a middle portion of the ink stroke 1105 (which may remain in the hole formed by the erased ring). The eraser stroke 1110 includes a plurality of eraser points; adjacent eraser points are connected by corresponding eraser segments. In FIG. 11A, five eraser points 1125 (e.g., eraser point 1125A, eraser point 1125B, eraser point 1125C, eraser point 1125D, and eraser point 1125E) and four eraser segments 1127 (e.g., eraser segment 1127A, eraser segment 1127B, eraser segment 1127C, and eraser segment 1127D) connecting the five eraser points 1125 are shown. The eraser stroke may be a longer or a shorter eraser stroke and include more or fewer eraser points and eraser segments.

Referring to FIG. 11A and FIG. 11B, an internal representation of the ink stroke 1105 and the eraser stroke 1110 shown in FIG. 11A is provided in FIG. 11B. The internal representation may be the result of the drying and optional splitting process. The internal representation may be created by updating the ink stroke data based on amount of overlap and location of contact between the ink stroke 1105 and the eraser stroke 1110, as described in step 435 of FIG. 4. As can be seen in FIG. 11A, the eraser stroke 1110 forms a ring around a middle portion of the ink stroke 1105, creating two separate portions of the ink stroke 1105 (an inner and an outer portion).

To create the internal representation provided in FIG. 11B, the ink stroke data for the ink stroke 1105 is updated. To update the ink stroke data for the ink stroke 1105, two sub ink strokes (e.g., a first sub ink stroke 1135 and a second sub ink stroke 1140) are created and each are decorated with an ink divot. The first sub ink stroke 1135 can be created by making a copy of the ink stroke data from the ink stroke 1105. Since every eraser segment in the eraser stroke 1110 contacts the ink stroke 1105, an ink divot 1150 can be generated as a copy of the eraser stroke 1110.

In this scenario, an additional piece of data is required when creating the two sub ink strokes. The additional piece of data is needed when an erase stroke splits an ink stroke in such a way that after removing unneeded ink stroke segments and areas covered by ink divots there are still some remaining disconnected areas (which are not part of the given sub ink stroke). To differentiate the desired area from any others, the aforementioned single (x, y) coordinate within the correct area's geometry is recorded.

For the first sub ink stroke 1135, a coordinate point 1160 can be assigned to a location at the outer portion of the ink stroke 1105 around the ring formed by the eraser stroke 1110. As previously discussed, the coordinate point 1160 can be a single (x,y) coordinate assigned to any location within the desired section's geometry to differentiate the desired area from any others. In this case, the coordinate point 1160 is assigned to the portion of the ink stroke 1105 outside of the ring formed of the eraser stroke 1110.

The second sub ink stroke 1140 can be created by making another copy of the ink stroke data from the ink stroke 1105. Since every eraser segment in the eraser stroke 1110 contacts the ink stroke 1105, an ink divot 1155 can be generated as a copy of the eraser segment 1127 of the eraser stroke 1110.

For the second sub ink stroke 1140, a coordinate point 1165 can be assigned to a location on the inner portion of the ink stroke 1105 within the ring formed by the eraser stroke 1110. As previously discussed, the coordinate point 1165 can be a single (x,y) coordinate assigned to any location within the desired section's geometry to differentiate the desired area from any others. In this case, the coordinate point 1165 is assigned to inside the middle portion of the ink stroke 1105 cut out by the eraser stroke 1110.

In this case, each sub ink stroke (e.g., the first sub ink stroke 1135 and the second sub ink stroke 1140) is a copy of the whole ink stroke 1105. Therefore, each sub stroke has the same set of ink points and the same divot, but each sub ink stroke has a different (x, y) coordinate (coordinate point) differentiating them. The drawing has been simplified to show an ink stroke with one ink segment. It should be understood that the ink stroke may be made of many ink points and corresponding ink segments, and that the ink points and ink segments of the portion of the ink stroke at the side of the erasing intersection would be stored as part of the sub ink stroke.

The first sub ink stroke 1135 represents the ink stroke 1105 from one side of the intersection location (e.g., the outer side) and the second sub ink stroke 1140 represents the ink stroke 1105 from the other side of the intersection location (e.g., the inner side). At the time of rendering the ink stroke, a geometry mask is generated that excludes all portions of the ink segment 1120 except the one containing the coordinate point. Similarly, at hit-testing time, the generated ink stroke geometry includes only the ink segment portion containing the coordinate point.

Referring to FIG. 11C, another representation of the ink stroke 1105 and the eraser stroke 1110 is provided, showing the shape of the "donut" cut out of the ink stroke. Here, the inner portion of the ink stroke 1170B formed by the eraser stroke 1110 is shown separate from the outer portion of the ink stroke 1170A.

Figure 12A:
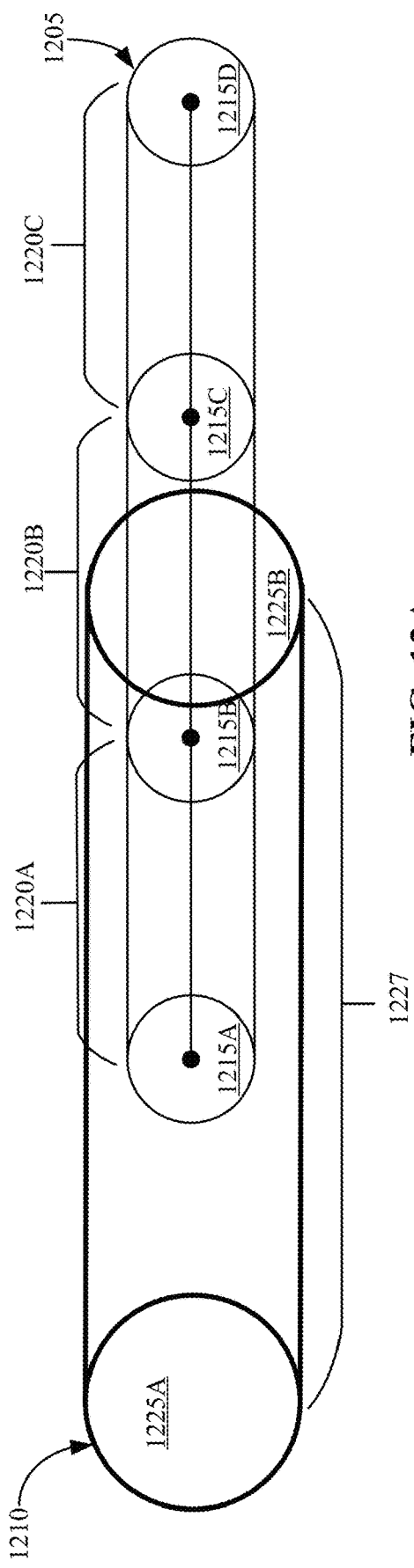
FIGS. 12A-12C illustrate example scenarios of an eraser stroke fully covering one or more ink segments of an ink stroke.
Figure 12B:
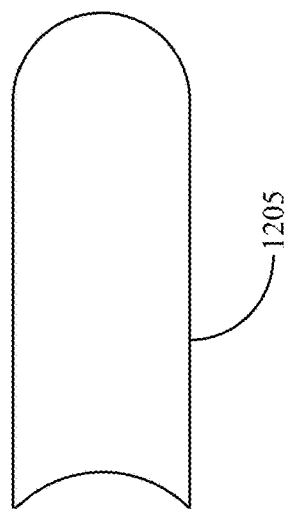
Figure 12C:
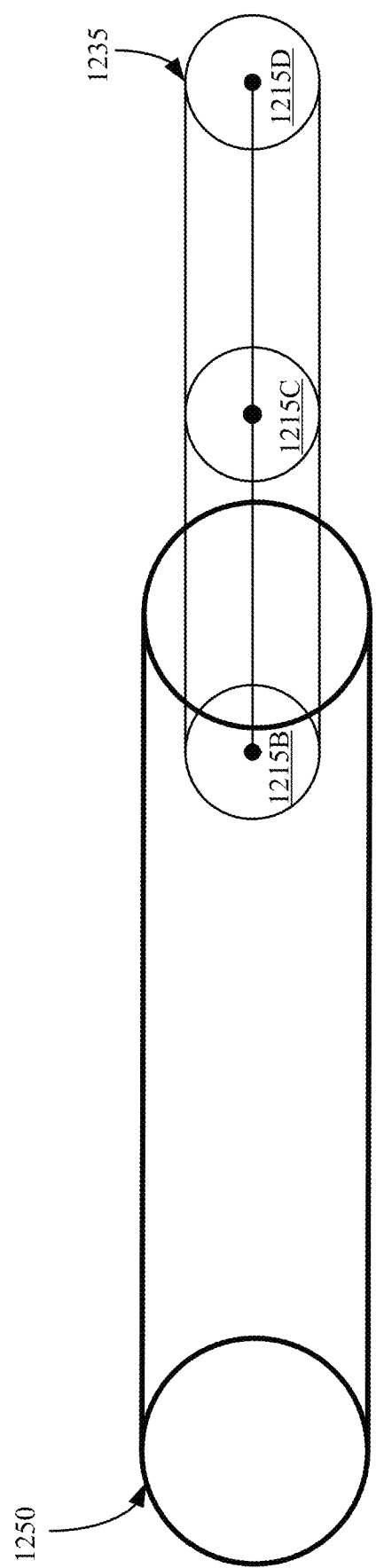

FIGS. 12A-12C illustrate an example scenario of an eraser stroke fully covering one or more ink segments of an ink stroke. In this example, using a UI of a content application, a user may first draw an ink stroke 1205 and then draw an eraser stroke 1210 that fully covers a number of ink segments of the ink stroke 1205, as shown in FIG. 12A. The ink stroke 1205 includes a plurality of ink points with adjacent ink points connected by corresponding ink segments. Referring to FIG. 12A, four ink points 1215 (e.g., ink point 1215A, ink point 1215B, ink point 1215C, and ink point 1215D) and three ink segments 1220 (e.g., ink segment 1220A, ink segment 1220B, and ink segment 1220C) are shown. The ink stroke may be a longer or shorter ink stroke and include more or fewer ink points and ink segments.

In the example scenario, the eraser stroke 1210 fully covers an ink segment of the ink stroke 1205. The eraser stroke 1210 includes a plurality of eraser points with adjacent eraser points connected by corresponding eraser segments. In FIG. 12A, two eraser points 1225 (e.g., eraser point 1225A and eraser point 1225B) and one eraser segment 1227 connecting the two eraser points 1225 are shown. The eraser stroke may be a longer or a shorter eraser stroke and include more or fewer eraser points and eraser segments.

Referring to FIG. 12A and FIG. 12B, a visual representation of the ink stroke 1205 and the eraser stroke 1210 shown in FIG. 12A is provided in FIG. 12B. The visual representation is the representation the user may see on the UI of the content application. In the visual representation, the ink stroke 1205 may appear to have a portion erased by the eraser stroke 1210.

Referring to FIG. 12A and FIG. 12C, an internal representation of the ink stroke 1205 and the eraser stroke 1210 shown in FIG. 12A is provided in FIG. 12C. The internal representation may be the result of the drying and optional splitting process. The internal representation may be created by updating the ink stroke data based on amount of overlap and location of contact between the ink stroke 1205 and the eraser stroke 1210, as described in step 435 of FIG. 4. As can be seen in FIG. 12A, the eraser stroke 1210 fully covers an ink segment (e.g., ink segment 1220A) of the ink stroke 1205.

To create the internal representation provided in FIG. 12C, the ink stroke data for the ink stroke 1205 is updated. To update the ink stroke data for the ink stroke 1205, a sub ink stroke (e.g., sub ink stroke 1235) is created and decorated with an ink divot. The sub ink stroke 1235 represents the portion of the ink stroke 1205 not fully covered by the eraser stroke 1210. In this case, the sub ink stroke 1235 represents ink segment 1220B and ink segment 1220C of the ink stroke 1205. The drawing has been simplified to show an ink stroke with three ink segments. It should be understood that the ink stroke may be made of many ink points and corresponding ink segments, and that the ink points and ink segments of the portion of the ink stroke at the side of the erasing contact would be stored as part of the sub ink stroke.

The sub ink stroke 1235 can be created by making a copy of the ink stroke data of the ink stroke 1205 from one side of the erasing contact. The copy of the ink stroke data includes the required ink points (e.g., ink point 1215B, ink point 1215C, and ink point 1215D) of the ink stroke 1205. An ink divot 1250 can be generated as a copy of the eraser segment 1227 of the eraser stroke 1210 that fully covers the ink segment of the ink stroke 1205.

In some cases, if the unioned geometry of the eraser strokes and ink divots fully covers the geometry of an ink stroke, the ink stroke is considered to be completely erased. The ink stroke and any sub ink strokes may be deleted.

Figures 13A, 13B:
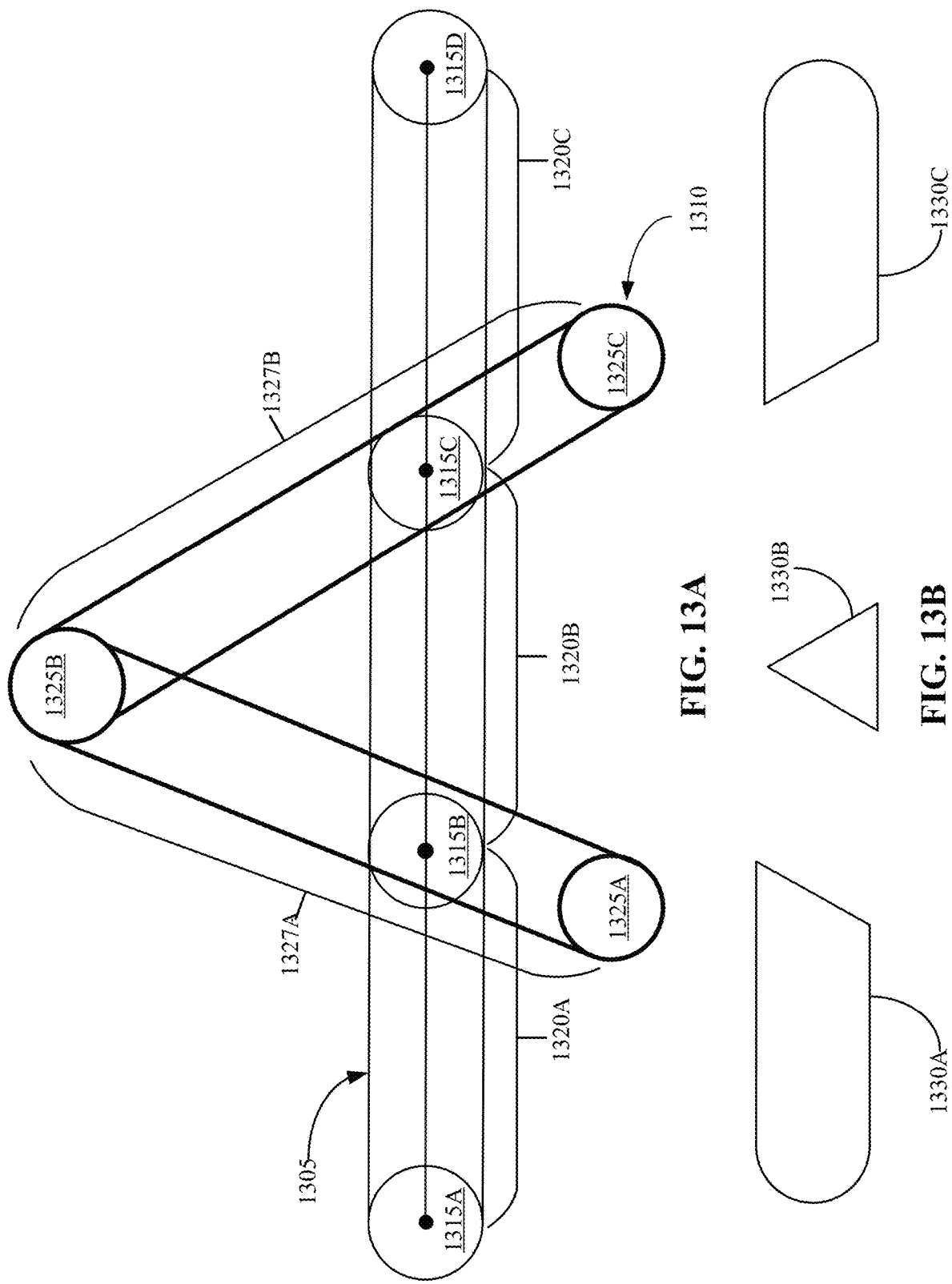
FIGS. 13A-13C illustrate example scenarios of an eraser stroke splitting an ink stroke into a plurality of sub ink strokes.
Figure 13C:
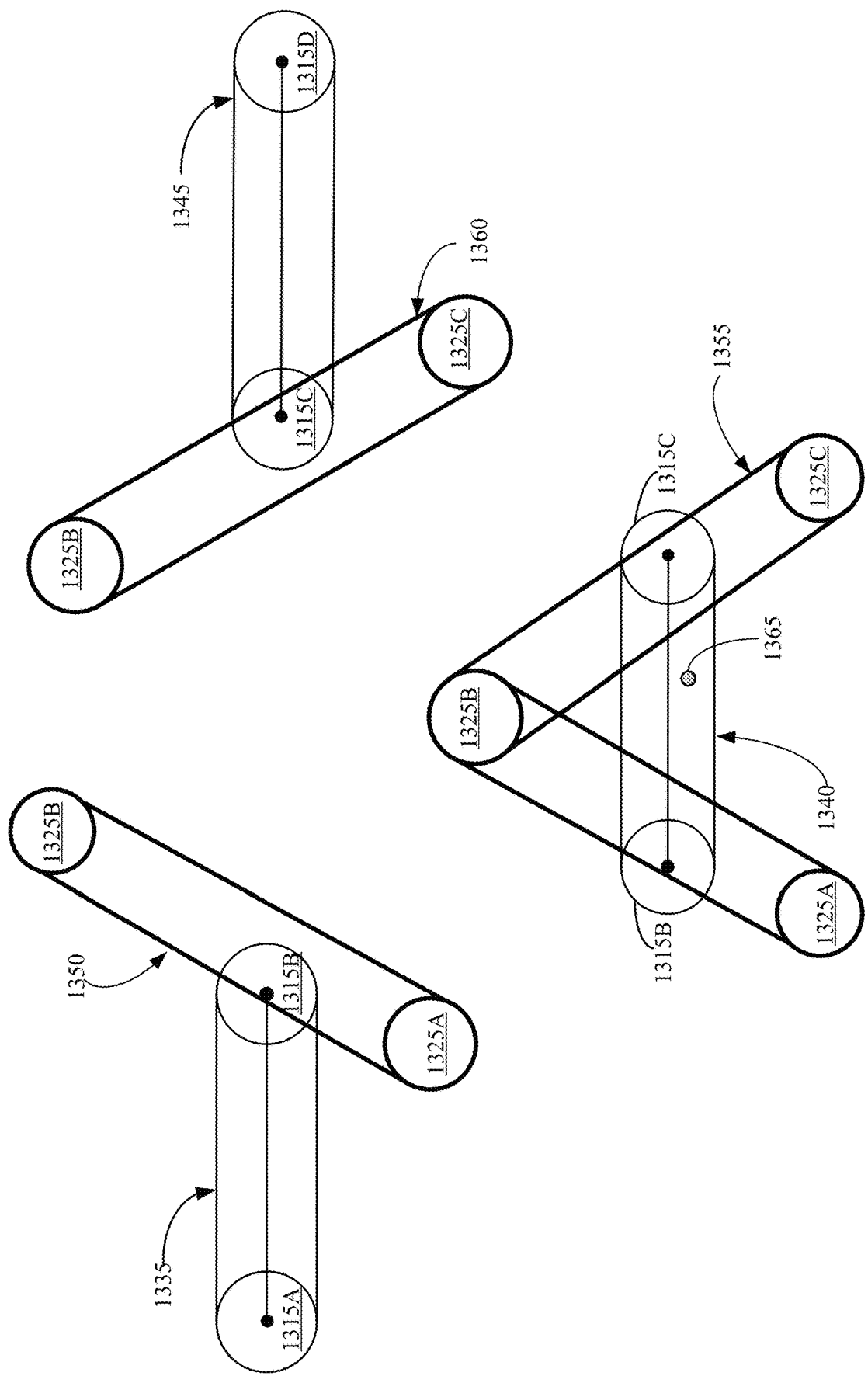

FIGS. 13A-13C illustrate example scenarios of an eraser stroke splitting an ink stroke into a plurality of sub ink strokes. In this example, using a UI of a content application, a user may first draw an ink stroke 1305 and then draw an eraser stroke 1310 that intersects the ink stroke 1305 at more than one location, as shown in FIG. 13A. The ink stroke 1305 includes a plurality of ink points with adjacent ink points connected by corresponding ink segments. Referring to FIG. 13A, four ink points 1315 (e.g., ink point 1315A, ink point 1315B, ink point 1315C, and ink point 1315D) and three ink segments 1320 (ink segment 1320A, ink segment 1320B, and ink segment 1320C) are shown. The ink stroke may be a longer or shorter ink stroke and include more or fewer ink points and ink segments.

In the example scenario, the ink stroke 1305 is intersected by the eraser stroke 1310 in two locations. The eraser stroke 1310 first intersects the ink stroke 1305 at ink point 1315B and then again at ink point 1315C. The eraser stroke 1310 includes a plurality of eraser points with adjacent eraser points connected by corresponding eraser segments. In FIG. 13A, three eraser points 1325 (e.g., eraser point 1325A, eraser point 1325B, and eraser point 1325C) and two eraser segments 1327 (e.g., eraser segment 1327A and eraser segment 1327B) connecting the three eraser points 1325 are shown. The eraser stroke may be a longer or a shorter eraser stroke and include more or fewer eraser points and eraser segments.

Referring to FIG. 13A and FIG. 13B, a visual representation of the ink stroke 1305 and the eraser stroke 1310 shown in FIG. 13A is provided in FIG. 13B. The visual representation is the representation the user may see on the UI of the content application. In the visual representation, the ink stroke 1305 may appear to be cut into three separate ink stroke sections (e.g., section 1330A, section 1330B, and section 1330C) by the eraser stroke 1310.

Referring to FIG. 13A FIG. 13C, an internal representation of the ink stroke 1305 and the eraser stroke 1310 shown in FIG. 13A is provided in FIG. 13C. The internal representation may be the result of the drying and optional splitting process. The internal representation may be created by updating the ink stroke data based on amount of overlap and location of contact between the ink stroke 1305 and the eraser stroke 1310, as described in step 435 of FIG. 4. As can be seen in FIG. 13A, the eraser stroke 1310 intersects the ink stroke 1305 at two locations, splitting the ink stroke 1305 into three separate ink strokes.

To create the internal representation provided in FIG. 13C, the ink stroke data for the ink stroke 1305 is updated. To update the ink stroke data for the ink stroke 1305, three sub ink strokes (e.g., a first sub ink stroke 1335, a second sub ink stroke 1340, and a third sub ink stroke 1345) are created and each decorated with one or more ink divots. The first sub ink stroke 1335 represents the ink stroke 1305 from one end of the ink stroke to the first intersection; the second sub ink stroke 1340 represents the ink stroke 1305 between the two intersections; and the third sub ink stroke 1345 represents the ink stroke 1305 from the second intersection to the other end of the ink stroke 1305. In this case, the first sub ink stroke 1335 represents the ink segment 1320A of the ink stroke 1305, the second sub ink stroke 1340 represents the ink segment 1320B of the ink stroke 1305, and the third sub ink stroke 1345 represents the ink segment 1320C of the ink stroke 1305. The drawing has been simplified to show an ink stroke with three ink segments. It should be understood that the ink stroke may be made of many ink points and corresponding ink segments, and that the ink points and ink segments of the portion of the ink stroke at the side of an erasing intersection would be stored as part of the sub ink stroke.

The first sub ink stroke 1335 can be created by making a copy of the ink stroke data of the ink stroke 1305 from one end of the ink stroke 1305 to the first intersection. The copy of the ink stroke data includes a copy of the required ink points (e.g., ink point 1315A and ink point 1315B) of the ink stroke 1305. An ink divot 1350 is generated as a copy of the eraser segment 1327A of the eraser stroke 1310 that intersects the ink stroke 1305 at the first intersection.

The second sub ink stroke 1340 can be created by making a copy of the ink stroke data of the ink stroke 1305 from between the two intersections. The copy of the ink stroke data includes a copy of the required ink points (e.g., ink point 1315B and ink point 1315C) of the ink stroke 1305. An ink divot 1355 is generated as a copy of the eraser segment 1327A and the eraser segment 1327B of the eraser stroke 1310. Eraser segment 1327A and eraser segment 1327B are the eraser segments that intersect the ink stroke 1305 at the two intersection points. Since eraser segment 1327A and eraser segment 1327B are adjacent eraser segments, only one ink divot is created.

In this scenario, an additional piece of data is used when creating the second sub ink stroke 1340. The additional piece of data is needed when an erase stroke splits an ink stroke in such a way that after removing unneeded ink stroke segments and areas covered by ink divots there are still some remaining disconnected areas (which are not part of the given sub ink stroke). To differentiate the desired area from any others, the aforementioned single (x, y) coordinate within the correct area's geometry is recorded.

For the second sub ink stroke 1340, a coordinate point 1365 can be assigned to a location between the two intersections. As previously discussed, the coordinate point 1365 can be a single (x,y) coordinate assigned to any location within the desired section's geometry to differentiate the desired area from any others. In this case, the coordinate point 1365 is assigned to the location between the two intersections on the ink stroke 1305 to differentiate the desired middle portion of the second sub ink stroke 1340 (e.g., the portion between the two intersections) from the two end portions of the second sub ink stroke 1340.

The third sub ink stroke 1345 can be created by making a copy of the ink stroke data of the ink stroke 1305 from the second intersection to the other end of the ink stroke 1305. The copy of the ink stroke data includes a copy of the required ink points (e.g., ink point 1315C and ink point 1315D) of the ink stroke 1305. An ink divot 1360 is generated as a copy of the eraser segment 1327B of the eraser stroke 1310 that intersects the ink stroke 1305 at the second intersection.

The first sub ink stroke 1335, the second sub ink stroke 1340, and the third sub ink stroke 1345 can be rendered independently.

FIGS. 14A-14F illustrate example scenarios of enhanced digital ink erasing carried out at a content curation application. A user may open a canvas interface 1405 of a content creation application 1400 on their computing device (embodied, for example, as system 11500 described with respect to FIG. 11). The computing device can be any computing device such as, but not limited to, a laptop computer, a desktop computer, a tablet, a personal digital assistant, a smart phone, a smart television, a gaming console, wearable device, and the like.

Figure 14A:
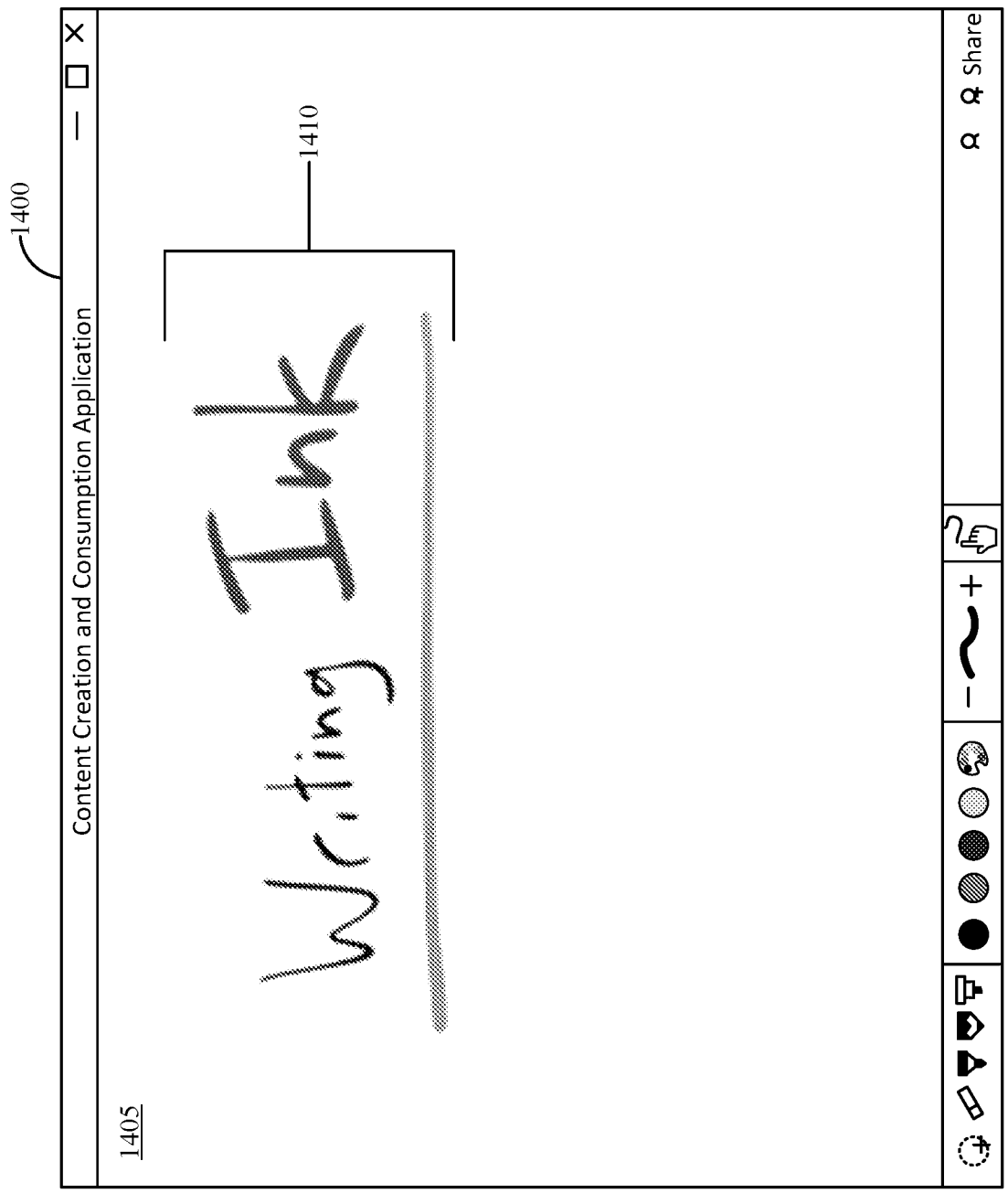
FIGS. 14A-14F illustrate example scenarios of enhanced digital ink erasing carried out at a content curation application.

Referring to FIG. 14A, the user may input inked content 1410 onto the canvas interface 1405 of the content creation application 1400 without the need for a keyboard. The inked content 1410 may include inked words or inked drawings. In this case, the inked content 1410 may include handwritten words "Writing Ink", along with an inked line underneath the handwritten words.

Figure 14B:
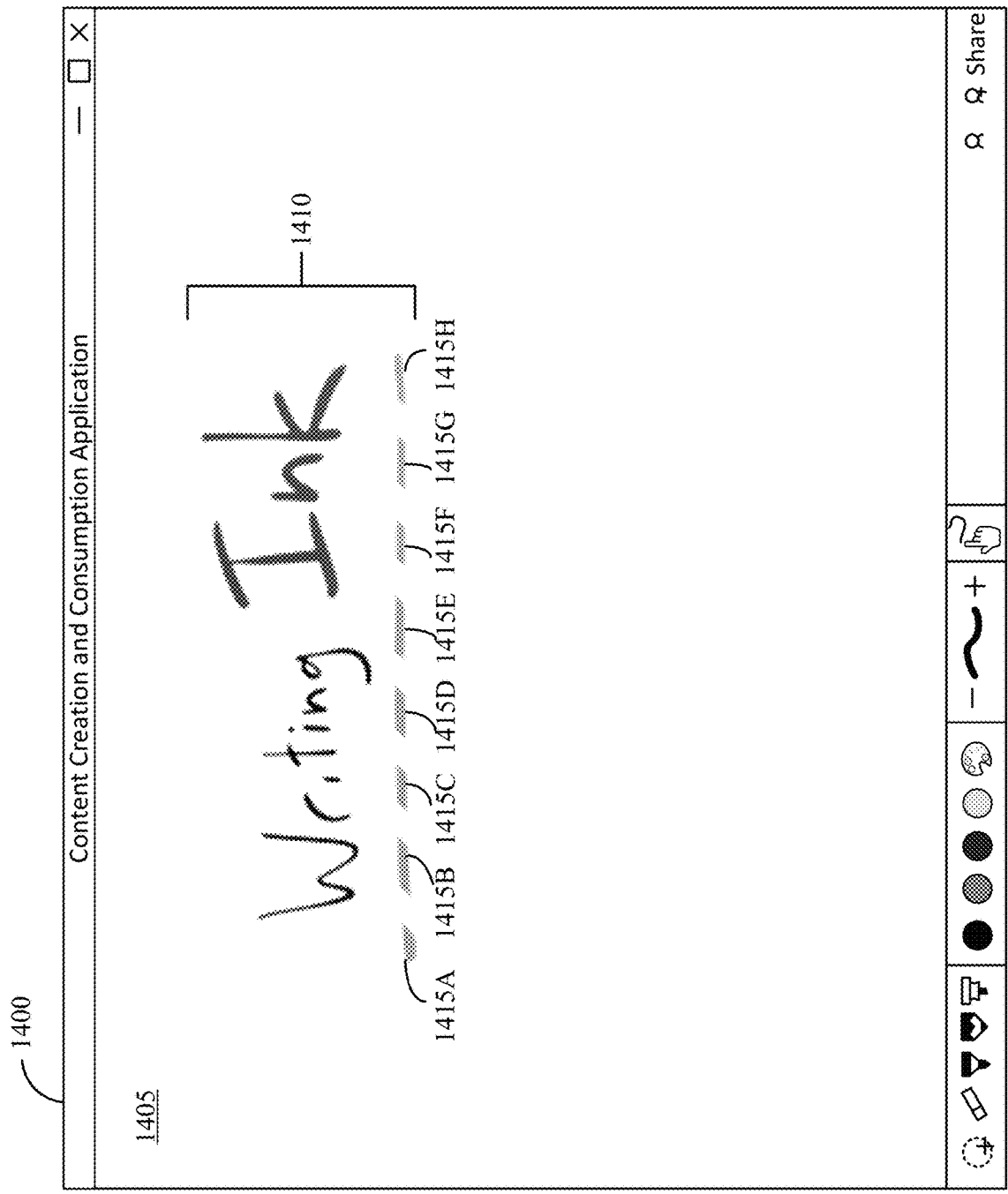

Referring to FIG. 14B, while the inked content 1410 is still shown on the canvas interface 1405 of the content creation application 1400, the user may decide they would like to erase part of the inked content 1410. In this case, the user has partially erased several portions of the inked line. Each portion (e.g., portion 1415A-1415H) of the inked line becomes a separate object that can be manipulated separate from the rest of the portions. Each portion of the inked line is stored as a sub ink stroke.

Figure 14C:
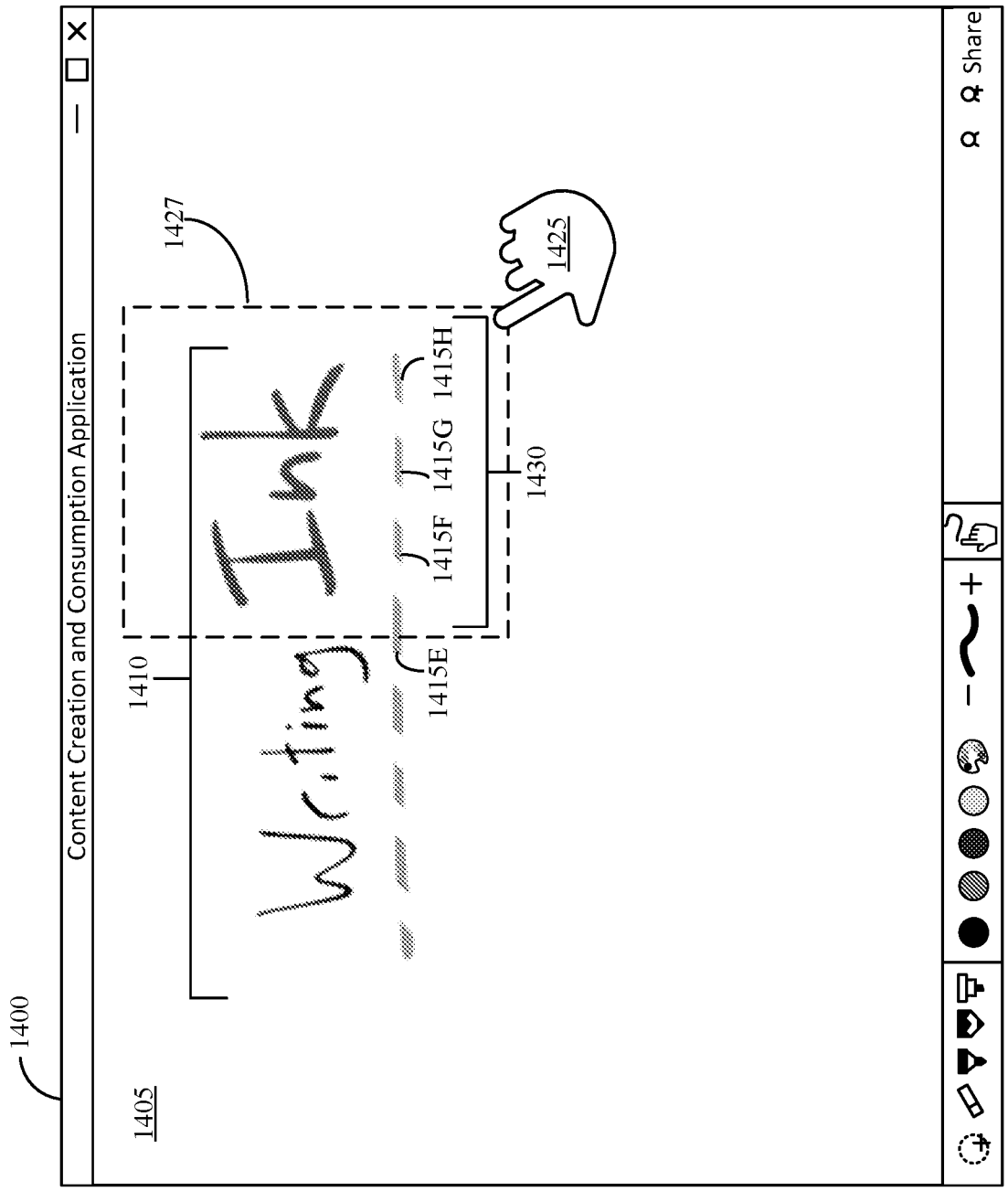

Referring to FIG. 14C, the user can select one or more sections of the inked content 1410 to be manipulated as a separate object. In the example of FIG. 14C, the user may have selected (1425) a portion of inked content 1410, such as inked content 1430. By selecting a portion of the inked content 1410, the inked content 1430 can become an independently modifiable object.

In some cases, only an ink stroke that has been fully selected may be included in the selected content. For example, the user has selected a portion of segment 1415D and all of segment 1415E, segment 1415G, and segment 1415H. However, only segment 1415E, segment 1415G, and segment 1415H may be included in the selected content. Therefore, the inked content 1430 includes the inked word "Ink" and multiple segments of the inked line, such as segment 1415F, segment 1415G, and segment 1415H.

In some cases, a selection box, such as selection box 1427 may be displayed around the selected content. In some cases, only an ink stroke that has been fully selected may be included in the selected content. For example, the user has selected a portion of segment 1415E and all of segment 1415F, segment 1415G, and segment 1415H. However, only segment 1415F, segment 1415G, and segment 1415H may be included in the selected content.

The selection (1425) action may be any suitable input such as touch, encircle, and the like. Although a finger is illustrated as the inking input tool, a pen or stylus or other object may be used. Other mechanisms for initiating the command to manipulate the inked content may be used as well.

Figure 14D:
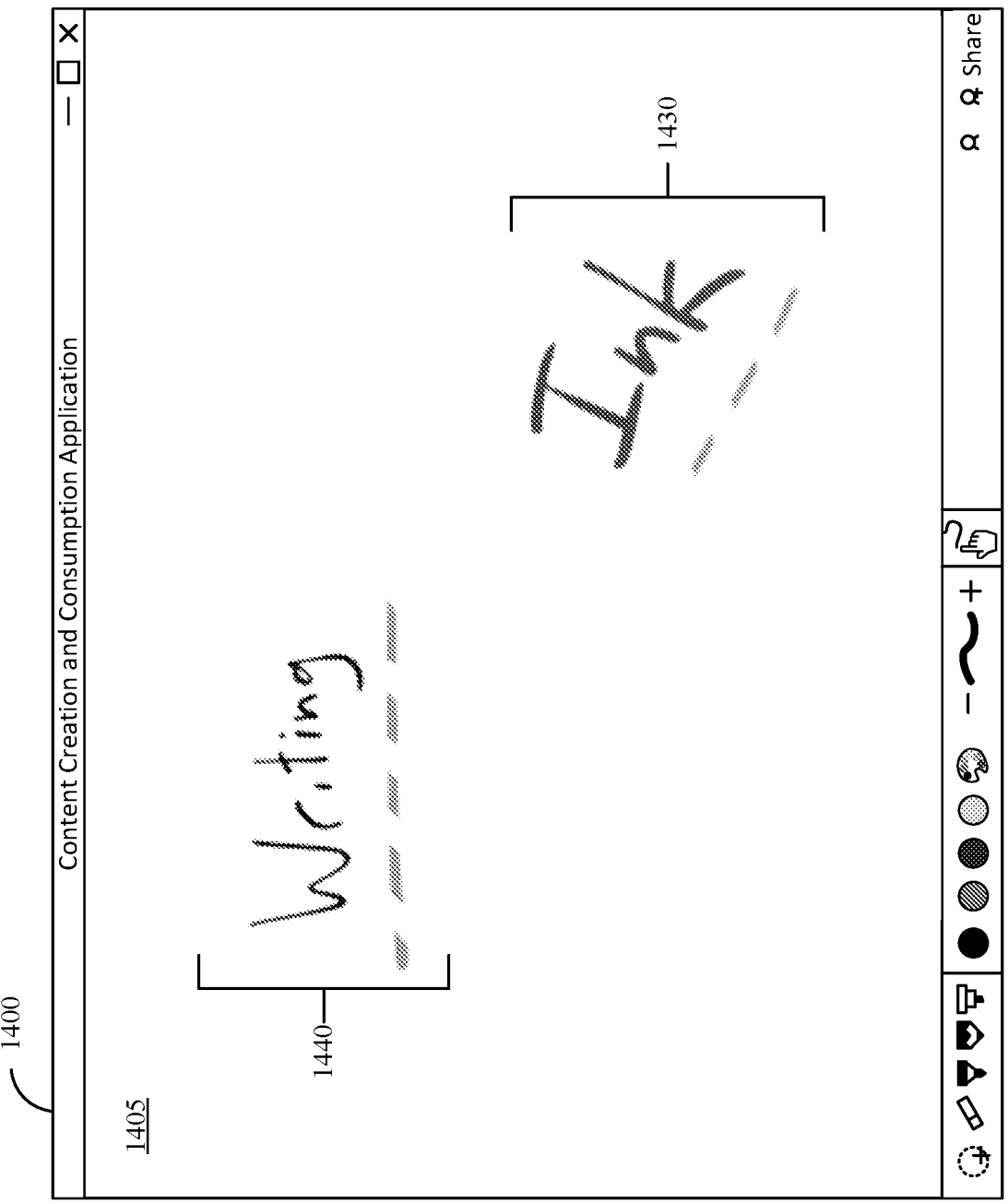

Referring to FIG. 14D, when the user selects (1425) the inked content 1430 (as shown in FIG. 14C), the user can manipulate the inked content 1430 as a separate object, while preserving the complex shapes that can result from partial erasure of ink strokes.

In the example of FIG. 14D, the user can move the inked content 1430 to another location of the canvas interface 1405, while the remaining portion (inked content 1440) of the inked content 1410 shown in FIGS. 14A and 14B stays in its original location. In some cases, the inked content 1430 may be further modified by the user. For example, the user may change the size or color of the inked content 1430.

Figure 14E:

Referring to FIG. 14E, the user can select the remaining portion (inked content 1440) of the inked content 1410 shown in FIGS. 14A and 14B to be manipulated as a separate object. In the example of FIG. 14E, a selection box 1445 may be displayed around the selected content (inked content 1440). The inked content 1440 includes the inked word "Writing" and multiple segments of the inked line, such as segment 1415A, segment 1415B, and segment 1415C, segment 1415D, and segment 1415D. By selecting a portion of the inked content 1410 shown in FIGS. 14A and 14B, the inked content 1430 can become an independently modifiable object.

In some cases, a toolbar, such as toolbar 1450 may be displayed on the canvas interface 1405 when a selection is made. The toolbar 1450 may include a variety of commands to manipulate the selected content. In the example of FIG. 14E, the user may select (1455) a command (e.g., command 1460) to display the selected content (e.g., inked content 1440) on a sticky note.

Figure 14F:
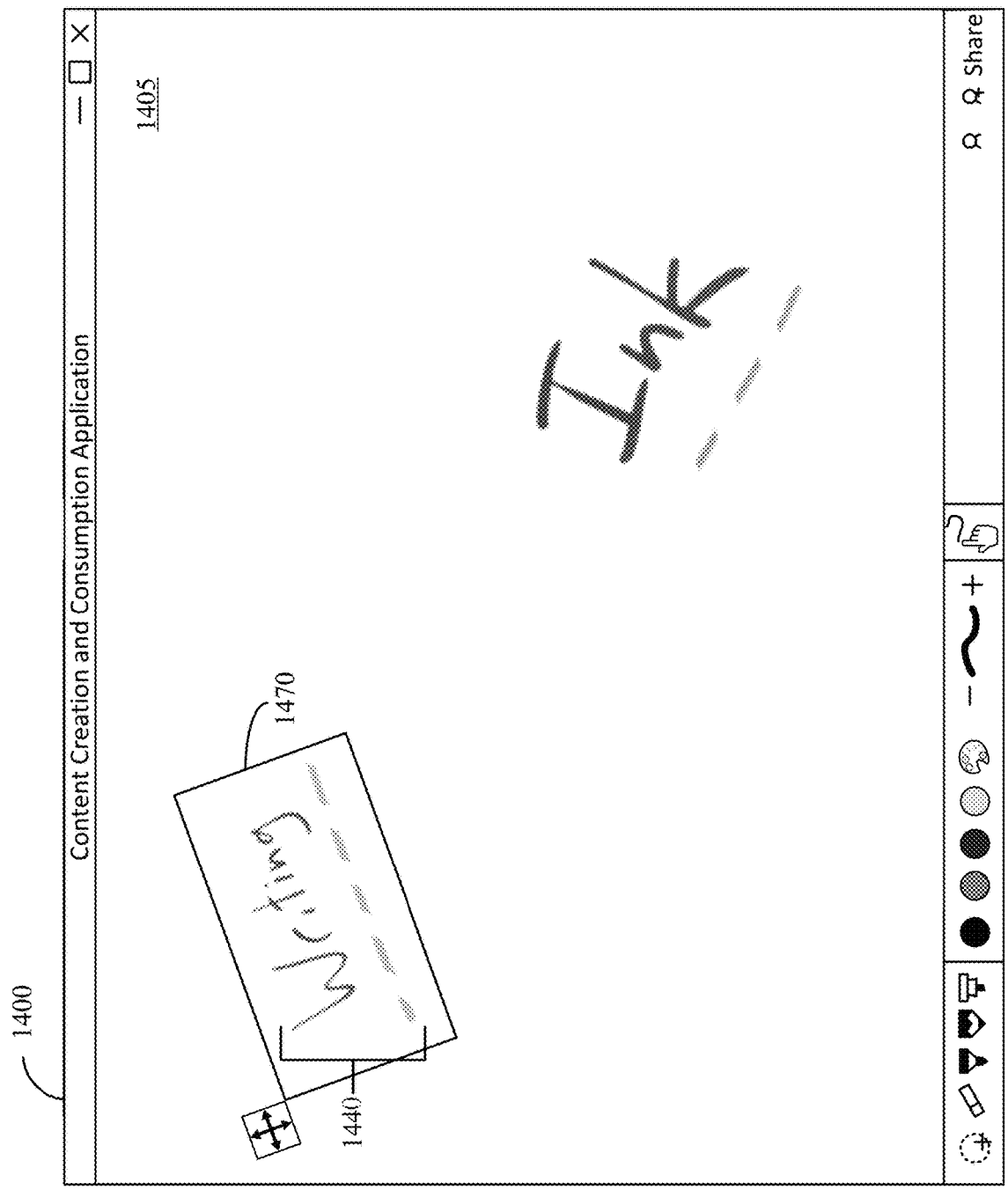

Referring to FIG. 14F, the selected ink content (e.g., inked content 1440) as shown in FIG. 14E, is displayed on a sticky note 1470. The sticky note 1470 may then be manipulated within the canvas interface 1405. In the example of 14F, the sticky note 1470 containing inked content 1440 was moved to another location on the canvas interface 1405, as well as sized down. In some cases, the sticky note 1470 and the inked content 1440 may be further modified by the user. For example, the user may change the color of the inked content 1440.

When the user selects the inked content 1440, the user can manipulate the inked content 1440 as a separate object, while preserving the complex shapes that can result from partial erasure of ink strokes.

Figure 15:
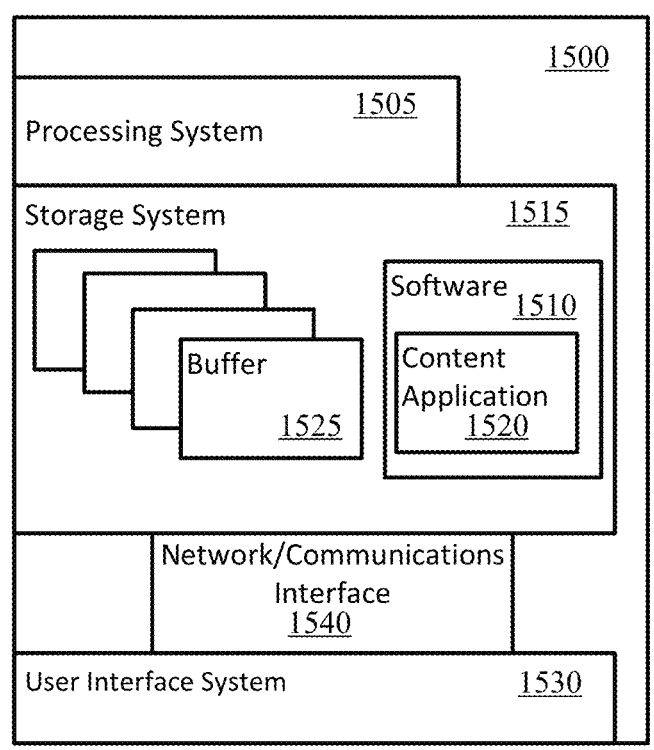
FIG. 15 illustrates components of a computing system or device that may be used in certain embodiments described herein.

FIG. 15 illustrates components of a computing system or device that may be used in certain embodiments described herein. Referring to FIG. 15, system 1500 represents a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 1500 may be incorporated to implement a particular computing device.

System 1500 includes a processing system 1505 of one or more processors to transform or manipulate data according to the instructions of software 1510 stored on a storage system 1515. Examples of processors of the processing system 1505 include general purpose central processing units, application specific processors, and logic devices, as well as any other type of processing device, combinations, or variations thereof. The processing system 1505 may be, or is included in, a system-on-chip (SoC) along with one or more other components such as network connectivity components, sensors, video display components.

The software 1510 can include an operating system and application programs such as a content application 1520. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 15, can be thought of as additional, nested groupings within the operating system space, each containing an OS, application programs, and APIs.

Storage system 1515 may comprise any computer readable storage media readable by the processing system 1505 and capable of storing software 1510 including the content application 1520.

Storage system 1515 may include volatile and nonvolatile, removable and non-removable media implemented in any method or technology for storage of information, such as computer readable instructions, data structures, program modules, or other data. Examples of storage media of storage system 1515 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory, propagated signal.

Storage system 1515 may be implemented as a single storage device but may also be implemented across multiple storage devices or sub-systems co-located or distributed relative to each other. Storage system 1515 may include additional elements, such as a controller, capable of communicating with processing system 1505. Storage system 1515 may include multiple buffers, such as buffer 1525.

Software 1510 may be implemented in program instructions and among other functions may, when executed by system 1500 in general or processing system 1505 in particular, direct system 1500 or the one or more processors of processing system 1505 to operate as described herein.

In general, software may, when loaded into processing system 1505 and executed, transform computing system 1500 overall from a general-purpose computing system into a special-purpose computing system customized to enhance ink erasing as described herein. Indeed, encoding software on storage system 1515 may transform the physical structure of storage system 1515. The specific transformation of the physical structure may depend on various factors in different implementations of this description. Examples of such factors may include, but are not limited to the technology used to implement the storage media of storage system 1515 and whether the computer-storage media are characterized as primary or secondary storage.

The system can further include user interface system 1530, which may include input/output (I/O) devices and components that enable communication between a user and the system 1500. User interface system 1530 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. For inclusion of the described enhanced erasing feature, the user interface system 1530 at least includes a touch-based user input interface or a digitizing pen used in place of or as part of the touch-based user input interface. A touch-based user input interface can include a touchscreen and/or surface with sensing components for a digitizer.

The user interface system 1530 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

Visual output may be depicted on the display in myriad ways, presenting graphical user interface elements, text, images, video, notifications, virtual buttons, virtual keyboards, or any other type of information capable of being depicted in visual form.

The user interface system 1530 may also include user interface software and associated software (e.g., for graphics chips and input devices) executed by the OS in support of the various user input and output devices. The associated software assists the OS in communicating user interface hardware events to application programs using defined mechanisms. The user interface system 1530 including user interface software may support a graphical user interface, a natural user interface, or any other type of user interface. For example, the interfaces for the enhanced ink erasing described herein may be presented through user interface system 1530.

Communications interface 1540 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 1500 is generally intended to represent a computing system with which software is deployed and executed in order to implement an application, component, or service as described herein. In some cases, aspects of computing system 1500 may also represent a computing system on which software may be staged and from where software may be distributed, transported, downloaded, or otherwise provided to yet another computing system for deployment and execution, or yet additional distribution.

Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

It should be understood that the examples described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A method of enhanced erasing of digital ink, the method comprising:
    receiving ink stroke data of an ink stroke, wherein the ink stroke data comprises a set of ink points, and wherein two adjacent ink points of the set of ink points are connected by a corresponding ink segment;
    displaying the ink stroke at a client device;
    receiving an eraser stroke that contacts the ink stroke, the eraser stroke having eraser stroke data, wherein the eraser stroke data comprises a set of eraser points, and wherein two adjacent eraser points are connected by an eraser segment, wherein the eraser stroke intersects the ink stroke at a first ink point of the ink stroke, appearing to split the ink stroke into two separate ink strokes;
    displaying the eraser stroke at the client device;
    discarding any eraser segments of the eraser stroke that do not contact the ink stroke;
    for any of the eraser segments of the eraser stroke that contact the ink stroke:
        updating the ink stroke data based on an entire amount of overlap and location of contact between the eraser stroke and the ink stroke, wherein the updating the ink stroke data comprises:
            creating a first sub ink stroke by making a copy of the ink stroke data from one side of the intersection and including a first copy the first ink point, and generating a first ink divot comprising a first entire copy of the eraser segment that intersects the ink stroke at the first ink point and a first copy of two eraser points of the set of eraser points that are connected by that eraser segment; and
            creating a second sub ink stroke by making a copy of the ink stroke data from the other side of the intersection and including a second copy of the first ink point, and generating a second ink divot comprising a second entire copy of the eraser segment that intersects the ink stroke at the first ink point and a second copy of the two eraser points of the set of eraser points that are connected by that eraser segment; and displaying the updated ink stroke with a portion of the ink stroke removed at the location of contact; and storing the updated ink stroke data comprising the first sub ink stroke with the first ink divot and the second sub ink stroke with the second ink divot and the third ink divot.

2. The method of claim 1, wherein the eraser stroke has transparent color.

3. An apparatus comprising:
one or more computer readable storage media;
a processing system; and
program instructions stored on at least one of the one or more computer readable storage media that, when executed by the processing system, direct the processing system to:
receive ink stroke data of an ink stroke, wherein the ink stroke data comprises a set of ink points, and wherein two adjacent ink points of the set of ink points are connected by a corresponding ink segment;
display the ink stroke;
receive an eraser stroke that contacts the ink stroke, the eraser stroke having eraser stroke data, wherein the eraser stroke data comprises a set of eraser points, and wherein two adjacent eraser points are connected by an eraser segment, wherein the eraser stroke intersects the ink stroke at a first ink point of the ink stroke, appearing to split the ink stroke into two separate ink strokes, and the eraser stroke overlaps the ink stroke at a second location without intersecting the ink stroke;
display the eraser stroke;
discard any eraser segments of the eraser stroke that do not contact the ink stroke;
for any of the eraser segments of the eraser stroke that contact the ink stroke:
update the ink stroke data based on an entire amount of overlap and location of contact between the eraser stroke and the ink stroke, wherein the instructions to update the ink stroke data direct the processing system to at least:
create a first sub ink stroke by making a copy of the ink stroke data from one side of the intersection and including a first copy of the first ink point, and generate a first ink divot at the first copy of the first ink point, the first ink divot comprising a first entire copy of the eraser segment that intersects the ink stroke at the first ink point and a first copy of two eraser points of the set of eraser points that are connected by that eraser segment; and
create a second sub ink stroke by making a copy of the ink stroke data from the other side of the intersection and including a second copy of the first ink point, the other side of the intersection having the second location, generate a second ink divot at the second copy of the first ink point, and generate a third ink divot at the second location, the second ink divot comprising a second entire copy of the eraser segment that intersects the ink stroke at the first ink point and a second copy of the two eraser points of the set of eraser points that are connected by that eraser segment and the third ink divot comprising an entire copy of the eraser segment that overlaps the ink stroke at the second location and a copy of the two eraser points of the set of eraser points that are connected by the eraser segment that overlaps the ink stroke at the second location; and display the updated ink stroke with a portion of the ink stroke removed at the location of contact; and store an updated ink stroke data comprising the first sub ink stroke with the first ink divot and the second sub ink stroke with the second ink divot and the third ink divot.

4. The apparatus of claim 3, wherein the eraser stroke has transparent color.

5. A computer readable storage medium having instructions stored thereon that, when executed by a processing system, direct the processing system to:
receive ink stroke data of an ink stroke, wherein the ink stroke data comprises a set of ink points, and wherein two adjacent ink points of the set of ink points are connected by a corresponding ink segment;
display the ink stroke at a client device;
receive an eraser stroke that contacts the ink stroke, the eraser stroke having eraser stroke data, wherein the eraser stroke data comprises a set of eraser points, and wherein two adjacent eraser points are connected by an eraser segment, wherein the eraser stroke intersects the ink stroke at a first location between a first ink point and a second ink point of the ink stroke, appearing to split the ink stroke into two separate ink strokes;
display the eraser stroke at the client device;
discard any eraser segments of the eraser stroke that do not contact the ink stroke;
for any of the eraser segments of the eraser stroke that contact the ink stroke:
update the ink stroke data based on an entire amount of overlap and location of contact between the eraser stroke and the ink stroke, wherein the instructions to update the ink stroke data direct the processing system to at least:
create a first sub ink stroke by making a first copy of the ink stroke data including the first location, generate a first ink divot at the first location, and assigning a first coordinate point on one side of the first location, the first ink divot comprising a first entire copy of the eraser segment that intersects the ink stroke at the first location and a first copy of two eraser points of the set of eraser points that are connected by that eraser segment; and
create a second sub ink stroke by making a second copy of the ink stroke data including the first location, generate a second ink divot at the first location, and assign a second coordinate point on the other side of the first location, the second ink divot comprising a second entire copy of the eraser segment that intersects the ink stroke at the first location and a second copy of the two eraser points of the set of eraser points that are connected by that eraser segment; and display the updated ink stroke with a portion of the ink stroke removed at the location of contact; and store the updated ink stroke data comprising the first sub ink stroke with the first ink divot and the second sub ink stroke with the second ink divot.

6. The computer readable storage medium of claim 5, wherein the instructions to display the updated ink stroke with the portion of the ink stroke removed at the location of contact direct the processing system to:
display the one side of the first sub ink stroke that includes the first coordinate point; and display the other side of the second sub ink stroke that includes the second coordinate point.

7. The computer readable storage medium of claim 5, wherein the eraser stroke has transparent color.

8. A method of enhanced erasing of digital ink, the method comprising:
- receiving ink stroke data of an ink stroke, wherein the ink stroke data comprises a set of ink points, and wherein two adjacent ink points of the set of ink points are connected by a corresponding ink segment;
- displaying the ink stroke at a client device;
- receiving an eraser stroke that contacts the ink stroke, the eraser stroke having eraser stroke data, wherein the eraser stroke data comprises a set of eraser points, and wherein two adjacent eraser points are connected by an eraser segment, wherein the eraser stroke overlaps the ink stroke at a first location without intersecting the ink stroke;
- displaying the eraser stroke at the client device;
- discarding any eraser segments of the eraser stroke that do not contact the ink stroke;
- for any of the eraser segments of the eraser stroke that contact the ink stroke:
  - updating the ink stroke data based on an entire amount of overlap and location of contact between the eraser stroke and the ink stroke, wherein the updating the ink stroke data comprises:
    - generating a first ink divot at the first location, the first ink divot comprising a first entire copy of the eraser segment that overlaps the ink stroke at the first location and a first copy of the two eraser points of the set of eraser points that are connected by that eraser segment; and
  - displaying the updated ink stroke with a portion of the ink stroke removed at the location of contact;
- storing the updated ink stroke data comprising the ink stroke having the first ink divot at the first location;
- receiving a second eraser stroke that intersects the ink stroke having the first ink divot at the first location, appearing to split the ink stroke, the second eraser stroke having second eraser stroke data, wherein the second eraser stroke data comprises a second set of eraser points, and wherein two adjacent eraser points of the second set of eraser points are connected by a second eraser segment;
- updating the ink stroke data based on an entire amount of overlap and location of contact between the second eraser stroke and the ink stroke having the first ink divot, wherein updating the ink stroke data based on the entire amount of overlap and location of contact between the second eraser stroke and the ink stroke having the first ink divot comprises:
- creating a first sub ink stroke by making a first copy of the ink stroke including a first copy of the first ink divot at the first location, generating a second ink divot at the location of the first copy of the first ink divot, and assigning a first coordinate point on one side of the first location, the second ink divot comprising a first entire copy of the second eraser segment that appears to split the ink stroke at the location of the first copy of the first ink divot and a first copy of the two adjacent eraser points of the second set of eraser points that are connected by that second eraser segment; and
- creating a second sub ink stroke by making a second copy of the ink stroke including a second copy of the first ink divot at the first location, generating a third ink divot at the second copy of the first ink divot, and assigning a second coordinate point on the other side of the first location, the third ink divot comprising a second entire copy of the second eraser segment that appears to split the ink stroke at the location of the first ink divot and a second copy of the two adjacent eraser points of the second set of eraser points that are connected by that second eraser segment; and
- storing the updated ink stroke data comprising the first sub ink stroke with the first copy of the first ink divot and the second ink divot, and the second sub ink stroke with the second copy of the first ink divot, and the third ink divot.

9. The method of claim 8, further comprising:
- displaying the one side of the first sub ink stroke that includes the first coordinate point; and
- displaying the other side of the second sub ink stroke that includes the second coordinate point.

10. The method of claim 8, wherein the second eraser stroke has transparent color.

* * * * *